(12) United States Patent
Dulin et al.

(10) Patent No.: US 8,818,903 B2
(45) Date of Patent: Aug. 26, 2014

(54) TRANSACTION COORDINATOR FOR DIGITAL CERTIFICATE VALIDATION AND OTHER SERVICES

(76) Inventors: Charles Dulin, Montclair, NJ (US); David Solo, New York, NY (US); Mack Hicks, San Francisco, CA (US); Larry Nepomuceno, Pleasant Hill, CA (US); Mark Stirland, Ipswich (GB)

( * ) Notice: Subject to any disclaimer, the term of this patent is extended or adjusted under 35 U.S.C. 154(b) by 0 days.

(21) Appl. No.: 11/603,755

(22) Filed: Nov. 22, 2006

(65) Prior Publication Data

US 2007/0073621 A1    Mar. 29, 2007

Related U.S. Application Data

(63) Continuation of application No. 09/950,440, filed on Sep. 10, 2001, now abandoned, which is a continuation of application No. 09/657,605, filed on Sep. 8, 2000, now abandoned.

(60) Provisional application No. 60/231,319, filed on Sep. 8, 2000, provisional application No. 60/153,726, filed on Sep. 13, 1999, provisional application No. 60/153,724, filed on Sep. 13, 1999, provisional application No. 60/153,203, filed on Sep. 10, 1999.

(51) Int. Cl.
    *G06Q 20/00*       (2012.01)
(52) U.S. Cl.
    USPC ............. 705/64; 709/201; 709/202; 709/237; 719/313
(58) Field of Classification Search
    USPC ........................................................ 705/50
    See application file for complete search history.

(56) References Cited

U.S. PATENT DOCUMENTS

| 4,304,990 | A | 12/1981 | Atalla |
| 5,048,085 | A | 9/1991 | Abraham et al. |
| 5,191,193 | A | 3/1993 | LeRoux |

(Continued)

FOREIGN PATENT DOCUMENTS

| EP | 0 784 282 A2 | 7/1997 |
| JP | 11-003387 | 1/1999 |

(Continued)

OTHER PUBLICATIONS

ABA School of Bank Card Management, http://www.aba.com/aba/ConferencesandEducation/SCH_BC99.asp.

(Continued)

*Primary Examiner* — Jamie Kucab
(74) *Attorney, Agent, or Firm* — Eric Sophir; Dentons US LLP

(57) ABSTRACT

System and methods for facilitating electronic commerce by securely providing certificate-related and other services, including certificate validation and warranty services. The system services include a certificate status check service and a warranty service. The certificate status check service allows a relying customer to validate a subscribing customer's digital certificate. The warranty service allows the relying customer to receive a collateral-backed warranty that the subscribing customer's digital certificate is valid, and also confirms the ability of the subscribing customer to pay. All participants and a root entity are provided with a transaction coordinator for combining services and operations into a single transaction having the qualities of atomicity, consistency, isolation, and durability. The transaction coordinator provides a single consistent interface for certificate-status messages and requests, as well as messages and requests relating to other services.

6 Claims, 15 Drawing Sheets

(56) References Cited

U.S. PATENT DOCUMENTS

| | | | |
|---|---|---|---|
| 5,353,350 A | 10/1994 | Unsworth et al. |
| 5,389,738 A | 2/1995 | Piosenka et al. |
| 5,406,630 A | 4/1995 | Piosenka et al. |
| 5,448,045 A | 9/1995 | Clark |
| 5,453,601 A | 9/1995 | Rosen |
| 5,511,121 A | 4/1996 | Yacobi |
| 5,557,518 A | 9/1996 | Rosen |
| 5,604,801 A | 2/1997 | Dolan et al. |
| 5,615,269 A | 3/1997 | Micali |
| 5,623,637 A | 4/1997 | Jones et al. |
| 5,638,446 A | 6/1997 | Rubin |
| 5,659,616 A | 8/1997 | Sudia |
| 5,668,878 A | 9/1997 | Brands |
| 5,671,279 A | 9/1997 | Elgamal |
| 5,677,955 A | 10/1997 | Doggett et al. |
| 5,680,455 A | 10/1997 | Linsker et al. |
| 5,689,565 A | 11/1997 | Spies et al. |
| 5,694,471 A | 12/1997 | Chen et al. |
| 5,703,949 A | 12/1997 | Rosen |
| 5,706,427 A | 1/1998 | Tabuki |
| 5,717,989 A | 2/1998 | Tozzoli et al. |
| 5,721,781 A | 2/1998 | Deo et al. |
| 5,745,571 A | 4/1998 | Zuk |
| 5,745,574 A | 4/1998 | Muftic |
| 5,754,772 A | 5/1998 | Leaf |
| 5,784,612 A | 7/1998 | Crane et al. |
| 5,790,677 A | 8/1998 | Fox et al. |
| 5,809,144 A | 9/1998 | Sirbu et al. |
| 5,815,657 A | 9/1998 | Williams et al. |
| 5,841,866 A | 11/1998 | Bruwer et al. |
| 5,842,211 A | 11/1998 | Horodan et al. |
| 5,845,260 A | 12/1998 | Nakano et al. |
| 5,847,374 A | 12/1998 | Menconi |
| 5,850,442 A | 12/1998 | Muftic |
| 5,861,662 A | 1/1999 | Candelore |
| 5,870,473 A | 2/1999 | Boesch et al. |
| 5,889,863 A | 3/1999 | Weber et al. |
| 5,892,900 A | 4/1999 | Ginter et al. |
| 5,903,882 A | 5/1999 | Asay et al. |
| 5,909,492 A | 6/1999 | Payne et al. |
| 5,913,210 A | 6/1999 | Call |
| 5,920,629 A | 7/1999 | Rosen |
| 5,920,847 A | 7/1999 | Kolling et al. |
| 5,937,068 A | 8/1999 | Audebert |
| 5,943,424 A | 8/1999 | Berger et al. |
| 5,944,789 A | 8/1999 | Tzelnic et al. |
| 5,956,404 A | 9/1999 | Schneier et al. |
| 5,958,051 A | 9/1999 | Renaud et al. |
| 5,970,475 A | 10/1999 | Barnes et al. |
| 5,987,440 A | 11/1999 | O'Neil et al. |
| 5,991,750 A | 11/1999 | Watson |
| 6,003,007 A | 12/1999 | DiRienzo |
| 6,003,765 A | 12/1999 | Okamoto |
| 6,014,646 A | 1/2000 | Vallee et al. |
| 6,029,150 A | 2/2000 | Kravitz |
| 6,035,402 A | 3/2000 | Vaeth et al. |
| 6,038,551 A | 3/2000 | Barlow et al. |
| 6,039,248 A | 3/2000 | Park |
| 6,044,350 A | 3/2000 | Weiant, Jr. et al. |
| 6,044,462 A | 3/2000 | Zubeldia et al. |
| 6,052,785 A | 4/2000 | Lin et al. |
| 6,067,621 A | 5/2000 | Yu et al. |
| 6,072,870 A | 6/2000 | Nguyen et al. |
| 6,081,790 A | 6/2000 | Rosen |
| 6,085,168 A | 7/2000 | Mori et al. |
| 6,085,321 A | 7/2000 | Gibbs et al. |
| 6,092,196 A | 7/2000 | Reiche |
| 6,092,201 A | 7/2000 | Turnbull et al. |
| 6,105,012 A | 8/2000 | Chang et al. |
| 6,115,642 A | 9/2000 | Brown et al. |
| 6,125,349 A | 9/2000 | Maher |
| 6,134,327 A | 10/2000 | Van Oorschot et al. |
| 6,134,550 A | 10/2000 | Van Oorschot et al. |
| 6,138,107 A | 10/2000 | Elgamal |
| 6,141,679 A * | 10/2000 | Schaefer et al. ............ 709/201 |
| 6,154,844 A | 11/2000 | Touboul et al. |
| 6,157,721 A | 12/2000 | Shear et al. |
| 6,157,917 A | 12/2000 | Barber |
| 6,157,920 A | 12/2000 | Jakobsson et al. |
| 6,157,927 A * | 12/2000 | Schaefer et al. ............ 707/103 R |
| 6,170,058 B1 | 1/2001 | Kausik |
| 6,175,921 B1 | 1/2001 | Rosen |
| 6,182,052 B1 | 1/2001 | Fulton |
| 6,185,683 B1 | 2/2001 | Ginter et al. |
| 6,209,091 B1 | 3/2001 | Sudia et al. |
| 6,223,291 B1 | 4/2001 | Puhl et al. |
| 6,233,339 B1 | 5/2001 | Kawano et al. |
| 6,236,972 B1 | 5/2001 | Shkedy |
| 6,272,675 B1 * | 8/2001 | Schrab et al. ............ 717/100 |
| 6,285,991 B1 | 9/2001 | Powar |
| 6,292,569 B1 | 9/2001 | Shear et al. |
| 6,301,658 B1 | 10/2001 | Koehler |
| 6,304,658 B1 | 10/2001 | Kocher et al. |
| 6,314,517 B1 | 11/2001 | Moses et al. |
| 6,324,525 B1 | 11/2001 | Kramer et al. |
| 6,327,578 B1 | 12/2001 | Linehan |
| 6,330,551 B1 | 12/2001 | Burchetta et al. |
| 6,341,353 B1 | 1/2002 | Herman |
| 6,353,812 B2 | 3/2002 | Frankel et al. |
| 6,356,878 B1 | 3/2002 | Walker et al. |
| 6,363,365 B1 | 3/2002 | Kou |
| 6,363,479 B1 | 3/2002 | Godfrey et al. |
| 6,370,249 B1 | 4/2002 | Van Oorschot |
| 6,373,950 B1 | 4/2002 | Rowney |
| 6,385,651 B2 | 5/2002 | Dancs et al. |
| 6,449,598 B1 | 9/2002 | Green et al. |
| 6,477,513 B1 | 11/2002 | Walker |
| 6,490,358 B1 | 12/2002 | Geer, Jr. et al. |
| 6,490,367 B1 | 12/2002 | Carlsson et al. |
| 6,496,858 B1 | 12/2002 | Frailong et al. |
| 6,510,513 B1 | 1/2003 | Danieli |
| 6,510,518 B1 | 1/2003 | Jaffe et al. |
| 6,523,027 B1 * | 2/2003 | Underwood ............ 707/4 |
| RE38,070 E | 4/2003 | Spies et al. |
| 6,560,581 B1 | 5/2003 | Fox et al. |
| 6,598,027 B1 | 7/2003 | Breen, Jr. et al. |
| 6,601,233 B1 * | 7/2003 | Underwood ............ 717/102 |
| 6,601,759 B2 | 8/2003 | Fife et al. |
| 6,609,128 B1 * | 8/2003 | Underwood ............ 707/10 |
| 6,633,878 B1 * | 10/2003 | Underwood ............ 707/100 |
| 6,643,701 B1 | 11/2003 | Aziz et al. |
| 6,658,568 B1 | 12/2003 | Ginter et al. |
| 6,675,153 B1 | 1/2004 | Cook et al. |
| 6,704,873 B1 * | 3/2004 | Underwood ............ 726/12 |
| 6,711,679 B1 | 3/2004 | Guski et al. |
| 6,715,080 B1 | 3/2004 | Starkovich et al. |
| 6,718,470 B1 | 4/2004 | Adams et al. |
| 6,718,535 B1 * | 4/2004 | Underwood ............ 717/101 |
| 6,763,459 B1 | 7/2004 | Corella |
| 6,766,454 B1 | 7/2004 | Riggins |
| 6,853,988 B1 | 2/2005 | Dickinson et al. |
| 6,865,674 B1 | 3/2005 | Mancini et al. |
| 6,889,325 B1 | 5/2005 | Sipman et al. |
| 6,973,571 B2 | 12/2005 | Lee et al. |
| 7,000,105 B2 | 2/2006 | Tallent, Jr. et al. |
| 7,072,870 B2 | 7/2006 | Tallent, Jr. et al. |
| 7,076,784 B1 * | 7/2006 | Russell et al. ............ 719/315 |
| 7,080,251 B2 | 7/2006 | Fujishiro et al. |
| 7,080,409 B2 | 7/2006 | Eigeles |
| 7,100,195 B1 * | 8/2006 | Underwood ............ 726/2 |
| 7,130,998 B2 | 10/2006 | Balfanz et al. |
| 7,165,178 B2 | 1/2007 | Gien et al. |
| 7,167,985 B2 | 1/2007 | Ahmed |
| 7,177,839 B1 | 2/2007 | Claxton |
| 7,200,573 B2 | 4/2007 | Miller et al. |
| 7,206,805 B1 * | 4/2007 | McLaughlin, Jr. ............ 709/203 |
| 7,424,616 B1 | 9/2008 | Brandenberg et al. |
| 2001/0011255 A1 | 8/2001 | Asay et al. |
| 2001/0020228 A1 | 9/2001 | Cantu et al. |
| 2001/0034724 A1 | 10/2001 | Thieme |
| 2002/0029194 A1 | 3/2002 | Lewis et al. |
| 2002/0029200 A1 | 3/2002 | Dulin et al. |
| 2002/0029337 A1 | 3/2002 | Sudia |
| 2002/0029350 A1 | 3/2002 | Cooper et al. |

(56) References Cited

U.S. PATENT DOCUMENTS

| | | |
|---|---|---|
| 2002/0046188 A1 | 4/2002 | Burges et al. |
| 2002/0059143 A1 | 5/2002 | Frankel |
| 2002/0065695 A1 | 5/2002 | Francoeur et al. |
| 2002/0095579 A1 | 7/2002 | Yoshiura et al. |
| 2002/0112156 A1 | 8/2002 | Gien et al. |
| 2002/0124172 A1 | 9/2002 | Manahan |
| 2002/0128940 A1 | 9/2002 | Orrin et al. |
| 2002/0129248 A1 | 9/2002 | Wheeler et al. |
| 2004/0111379 A1* | 6/2004 | Hicks et al. ............ 705/76 |
| 2004/0187031 A1 | 9/2004 | Liddle |
| 2005/0114666 A1 | 5/2005 | Sudia |
| 2005/0132229 A1 | 6/2005 | Zhang et al. |
| 2006/0004670 A1 | 1/2006 | McKenney et al. |
| 2007/0073621 A1 | 3/2007 | Dulin et al. |
| 2008/0010665 A1 | 1/2008 | Hinton et al. |

FOREIGN PATENT DOCUMENTS

| | | |
|---|---|---|
| JP | 11-503541 | 3/1999 |
| JP | 2001-507145 | 5/2001 |
| JP | 2002-536706 | 10/2002 |
| JP | 2002-536735 | 10/2002 |
| WO | WO 96/31965 | 10/1996 |
| WO | WO 96/31965 A1 | 10/1996 |
| WO | WO 98/26385 | 6/1998 |
| WO | WO 98/26386 A1 | 6/1998 |
| WO | WO 99/22291 | 5/1999 |
| WO | WO 00/45564 | 8/2000 |
| WO | WO 00/48108 | 8/2000 |
| WO | WO 00/67143 | 11/2000 |
| WO | WO 01/18717 A1 | 3/2001 |
| WO | 98/26385 A3 | 4/2010 |

OTHER PUBLICATIONS

"Acceptance of Signature Guarantees From Eligible Guarantor Institutions", 56 Fed. Reg. 18380, (Apr. 22, 1991).
"Acceptance of Signature Guarantees From Eligible Guarantor Institutions", 56 Fed. Reg. 46748, (Sep. 16, 1991) (to be codified at 17 CFR pt. 240).
Aiken, Peter et al., Microsoft Computer Dictionary, Microsoft Press, 5th Edition, p. 290.
Aslam, Taimur, Protocols for e-commerce: including related article on BlueMoney commerce model, Dr. Dobb's Journal, Dec. 1998.
"Baltimore Announces Support for Identrus, the Global Trust Organization", *Business Wire*, New York: Apr. 12, 1999, p. 1, Proquest #40459204, 3 pages.
Banking Bulletin from Christopher M. Cross, Deputy Comptroller for Compliance, Comptroller of the Currency Administrator of National Banks, to national Banks Registered as a Transfer Agent, District Deputy Comptrollers, Department and Division Heads, and all Examining Personnel, Re: Adoption of New Transfer Agent (Feb. 12, 1992).
Biddle, C. Bradford, "Comment, Misplaced Priorities: The Utah Digital Signature Act and Liability Allocation in a Public Key Infrastructure", San Diego Law Review 33, 1143, 1996.
Breedon, Richard C., Chairman, U.S. Securities and Exchange Commission, Letter to the Honorable Jake Gam, Senate Banking, Housing, and Urban Affairs Committee (Mar. 6, 1990).
Brown-Humes, Christopher, and Graham, George, "Banks join forces to provide guarantees on internet trading", Financial Times, London, UK: Apr. 12, 1999, p. 20, Proquest #40448447, 3 pages.
Brown, Mark R., "Special Edition Using Netscape 2" 1995. 2nd Edition, p. 287,288, 876-879.
"Entrust Technologies Supports Newly Formed Identrus Organization", *Business Wire*, New York: Apr. 12, 1999, p. 1, Proquest #40463049,3 pages.
Guttman, Egon, Professor of Law, the American University, Washington College of Law, letter to Jonathan G. Katz, Esq., Secretary to the Securities and Exchange Commission, Re: Securities Exchange Act Release No. 34-29663 Notice of Proposed Rule Making, new Rule 17 Ad-15 File No. 57-27-91 (Oct. 28, 1991).
Hallam-Baker, Phillip M., Micro Payment Transfer Protocol (MPTP), Ver. 0.1, W3C Working Draft, at http://www.w3.org/pub/WWW/TR/WD-mptp-951122 (Nov. 22, 1995).
Hallerman, David, "Will Banks Become E-Commerce Authorities?", *Bank Technology News*, New York: Jun. 1999, vol. 12, Issue 6, p. 1; Proquest 42664468, 8 pages.
"Identrus begins pilot, Bits Opens Doors to Lab", *Corporate EFT Report*, Potomac, Jul. 21, 1999, vol. 19, Issue 14;p. 1; Proquest #43335701, 2 pages.
Jueneman, Robert R., of GTE laboratories, "E-mail to Mike Roe and Warwick Ford, re: User Key Material Proposal", Sep. 8, 1994, 5:49 EDT) (ftp://ftp.tis.com/pub/pem-dev/archive).
Jueneman, Robert R., of GTE laboratories, "E-mail to Peter Willimas, Verisign, re: Certificate hierarchies and SEPP/STT concepts, part 2", Oct. 13, 1995, 17:49 EDT) (ftp://ftp.tis.com/pub/pem-dev/archive).
Jueneman, Robert R., of GTE laboratories, "E-mail to Phill Hallam, W3C, re: Nonrepudiation and CA Liabilities", Oct. 16, 1995, 15:54 EDT) (ftp://ftp.tis.com/pub/pem-dev/archive).
Jueneman, Robert R., of GTE laboratories, "E-mail to Hal Finney, re: Nonrepudiation and CA liabilities", Oct. 19, 1995, 15:31 EDT) (ftp://ftp.tis.com/pub/pem-dev/archive).
Kaner, Cem, The Insecurity of the Digital Signature, at http://www.badsoftware.com/digsig.htm (Sep. 1997).
Kutler, Jeffrey, "ABA's Certificate Venture Aims to Give Banks the Lead in Secure Net Payments," American Banker, New York, NY: May 14, 1999, vol. 164, Issue 92; p. 1; Proquest #41354786, 3 pages.
Linehan, Mark & Gene Tsidik, Internet Keyed Payments Protocol (iKP), at http://www.zurichibm.com/Technolo.../ecommerce/draft-tsudik-ikp-00.txt (Jul. 1995).
Marketing Brochure, Securities Transfer Agent Medallion Program (1991).
MasterCard Int'l Inc. Operations Manual §§ 5.11-5.14 (Nov. 1993).
Merrill, Charles R., "An Attorney's Roadmap to the Digital Signature Guideline", in 1318 Lecture Notes in Computer Science 291, 291-297 (Rafael Hirschfield ed. 1997).
Mitchell, C.J. et al., *Contemporary Cryptology: The science of Information Integrity* pp. 325-378 (Simmons ed., IEEE Press, 1992).
Pamatatau, Richard, "CA anticipates a secure e-commerce infrastructure", *Dominion*, Wellington, New Zealand, Jul. 26, 1999, P.IT. 8, Proquest #43762280, 3 pages.
Pfitzmann, Birgit, "Digital Signatures Schemes", 1100 Lecture Notes in Computer Science (Goss et al. eds. 1996).
Schapiro, Mary L., "Clarifying Elimination of Stock Certificates", *Wall Street Journal*, Jan. 17, 1991.
SET: Secure Electronic Transaction Specification, May 31, 1997, Version 1, pp. 1-619.
Solomon, Howard, "Canadian banks vault into e-com identity service", *Computing Canada*, Jun. 4, 1999, v25i22pg23; Proquest #42244579, 3 pgs.
STAMP Initiative Receives Support from SEC, STA Newsletter (The Securities Transfer Association, Inc.), Jun. 30, 1990, at 1, 4.
"ValiCert Selected as Validation Technology for Identrus' Global Business to Business E-Commerce Pilot", *PR Newswire*, New York: Jul. 12, 1999, p. 1; Proquest #43079343, 3 pages.
Patent Cooperation Treaty, "PCT International Search Report", issued for PCT/US00/24661, mailed Jan. 25, 2001.
Patent Cooperation Treaty, "PCT International Search Report", issued for PCT/US00/24607, mailed Jan. 9, 2001.
Patent Cooperation Treaty, "PCT International Search Report", issued for PCT/US02/12947, mailed Jun. 21, 2002.
Patent Cooperation Treaty, "PCT International Search Report", issued for PCT/US01/25389, mailed Nov. 23, 2001.
Patent Cooperation Treaty, "PCT International Search Report", issued for PCT/US00/24663, mailed Dec. 29, 2000.
Patent Cooperation Treaty, "PCT International Search Report", issued for PCT/US01/25388, mailed Nov. 19, 2001.
Patent Cooperation Treaty, "PCT International Search Report", issued for PCT/US00/03552, mailed Jun. 13, 2000.
Patent Cooperation Treaty, "PCT International Search Report", issued for PCT/US00/03550, mailed May 2, 2000.

(56) References Cited

OTHER PUBLICATIONS

Patent Cooperation Treaty, "PCT International Search Report", issued for PCT/US01/28275, mailed Dec. 31, 2001.
Patent Cooperation Treaty, "PCT International Search Report", issued for PCT/US01/28277, mailed Dec. 14, 2001.
Patent Cooperation Treaty, "PCT International Search Report", issued for PCT/US01/28278, mailed Dec. 3, 2001.
Patent Cooperation Treaty, "PCT International Search Report", issued for PCT/US00/24662, mailed Jan. 23, 2001.
Patent Cooperation Treaty, "PCT International Search Report", issued for PCT/US00/24606, mailed Jan. 17, 2001.
Patent Cooperation Treaty, "PCT International Search Report", issued for PCT/US00/24608, mailed Dec. 8, 2000.
Patent Cooperation Treaty, "PCT International Search Report", issued for PCT/US09/00357, mailed Mar. 24, 2009.
European Patent Office, Supplementary European Search Report for EP 00961672, Munich Germany, Jun. 12, 2009.
Sakurai, Authentication Technologies on Internet, NEC Technical Journal, 1998, vol. 51, No. 9, 10 pages, with English translation of relevant portions.
Japanese Office Acton dated Aug. 28, 2013 in related Application No. JP 2011-254356, in Japanese, with English translation, 8 pages.
Japanese Office Action dated Aug. 28, 2013 in related Application No. JP 2011-254357, in Japanese, with English translation, 7 pages.
Japanese Office Action dated Aug. 28, 2013 in related Application No. JP 2011-254358, in Japanese, with English translation, 8 pages.
Sugiyama, "Investigation in the USA on Authentication Business in Financial Institution", The Center for Financial Industry Information Systems (FISC), No. 205, pp. 50-62, Sep. 1, 1998.
Japanese Patent Office, Office Action issued in Patent Application JP 2001-526778, on Feb. 10, 2010.
JP 11-003387 published Jan. 6, 1999, abstract only in English, downloaded from PAJ, 1 page.
JP 11-503541 published Mar. 26, 1999, abstract only in English, downloaded from espacenet.com, 1 page.
Japanese Office Action dated Apr. 8, 2010 in related Application No. JP 2001-522463, in Japanese, includes English translation, 10 pages.
Japanese Office Action dated Jul. 21, 2011 in related Application No. JP 2001-522463, English translation, 3 pages.
Japanese Office Action dated Dec. 2, 2010 in related Application No. JP 2001-522463, includes English translation, 7 pages.

* cited by examiner

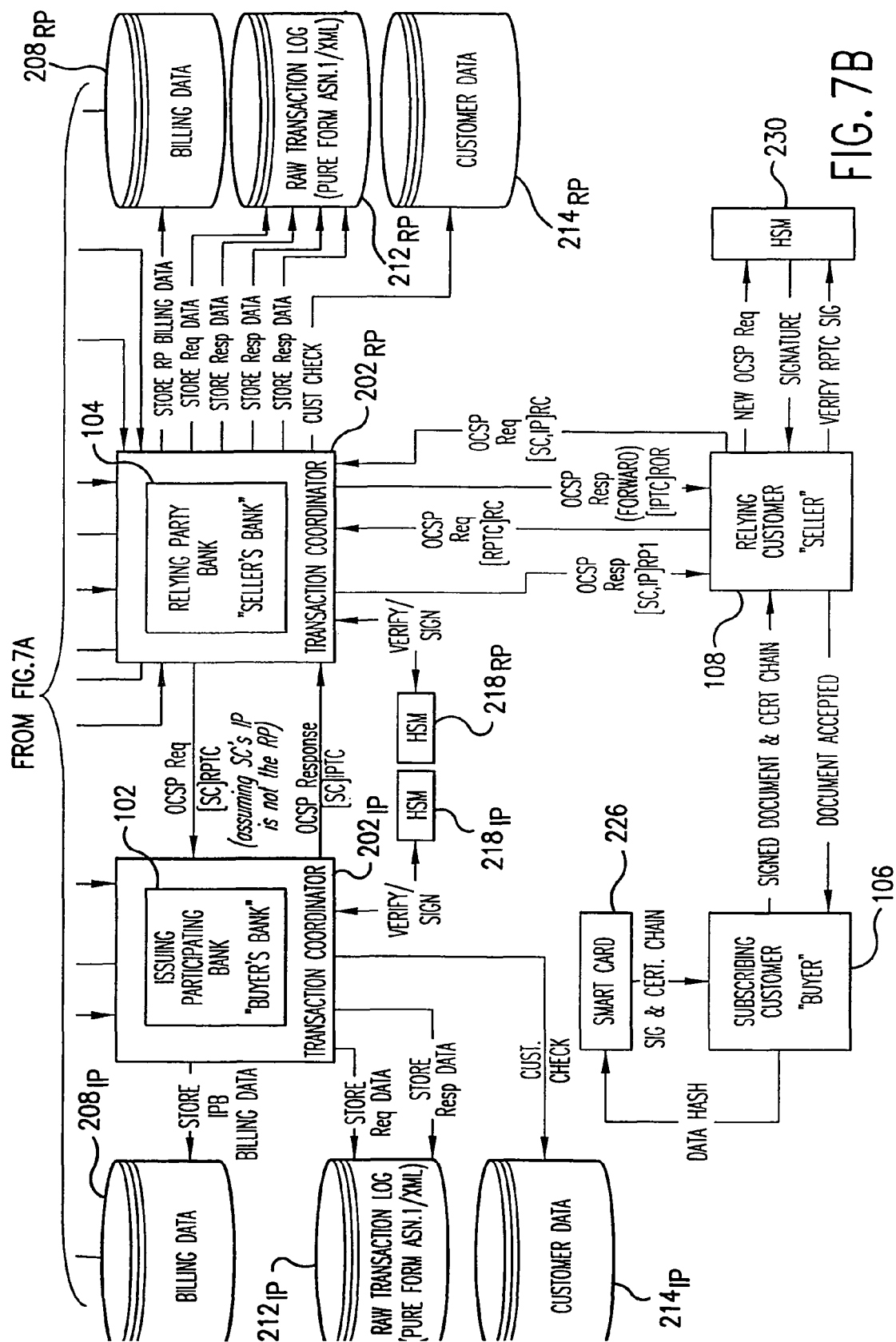

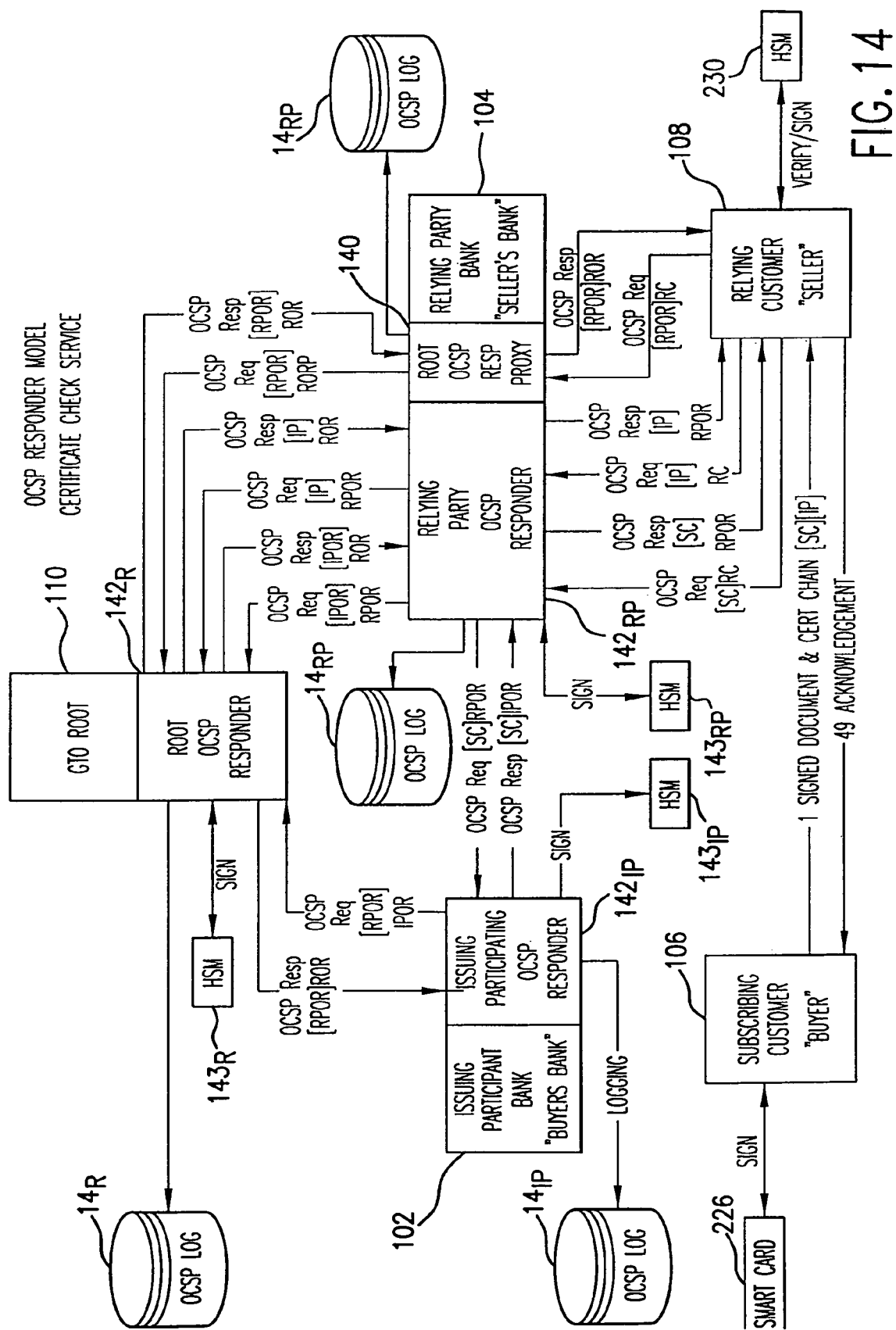

TRANSACTION COORDINATOR FOR DIGITAL CERTIFICATE VALIDATION AND OTHER SERVICES

RELATED APPLICATIONS

This application is a continuation of and claims priority from U.S. patent application Ser. No. 09/950,440 filed Sep. 10, 2001 now abandoned entitled System and Method for Providing Certificate Validation and Other Services, which application claims priority from U.S. provisional patent application Ser. No. 60/231,319, filed Sep. 8, 2000, entitled Transaction Coordinator Certificate Status Check (CSC) Protocol Definition, Transaction Coordinator Messaging Protocol Definition, and Transaction Coordinator Requirements. Said two prior patent applications are hereby incorporated by reference in their entireties into the present patent application. Application Ser. No. 09/950,440 is also a continuation of U.S. patent application Ser. No. 09/657,605, filed Sep. 8, 2000, now abandoned entitled System and Method for Providing Certificate Validation and Other Services, which claimed priority to U.S. provisional patent application 60/153,726, filed Sep. 13, 1999, entitled Transaction Coordinator for Certificate Status Checking and Other Services; U.S. provisional patent application 60/153,724, filed Sep. 13, 1999, entitled Transaction Coordinator Requirements and High Level Design; and U.S. provisional patent application Ser. No. 60/153,203, filed Sep. 10, 1999, entitled System and Process for Certification in Electronic Commerce. All of the prior patent applications mentioned in this paragraph are hereby incorporated by reference in their entireties into the present patent application.

FIELD OF THE INVENTION

This invention relates generally to the field of facilitating electronic commerce by providing services via a public key infrastructure.

BACKGROUND OF THE INVENTION

The world of electronic commerce has created new challenges to establishing relationships between contracting parties. One of those challenges springs from the fact that the parties to the transaction cannot see or hear each other, and cannot otherwise easily confirm each other's identity and authority to act.

One remedy for this problem is to provide each contracting party with a private key for signing transmitted messages. The signing party makes available an associated public key that decrypts messages signed with the party's private key, and thus enables a receiving party to confirm the identity of the sender.

But the sender's public key may not be known a priori to the recipient. In that event, the sender may transmit with its signed message a digital certificate issued by a certificate authority. The certificate is itself a signed electronic document (signed with the private key of the certificate authority) certifying that a particular public key is the public key of the sender. In some cases, the recipient may be unfamiliar with the public key of the certificate authority or may not know whether the certificate is still valid. In that event, the recipient may wish to check the authenticity and validity of the certificate with an entity that it trusts. One known protocol for checking certificate status is the on-line certificate status protocol (OCSP).

SUMMARY OF THE INVENTION

Systems and methods for facilitating electronic commerce by securely providing certificate-related and other services including certificate validation and warranty. In a preferred embodiment, these services are provided within the context of a four-corner trust model. The four-corner model comprises a buyer, referred to as the subscribing customer, and a seller, referred to as the relying customer, who engage in an on-line transaction. The buyer is a customer of a first financial institution, referred to as an issuing participant. The issuing participant acts as a certificate authority for the buyer and issues the seller a hardware token including a private key and a digital certificate signed by the issuing participant. The seller is a customer of a second financial institution, referred to as the relying participant. The relying participant acts as a certificate authority for the seller and issues the seller a hardware token including a private key and a digital certificate signed by the relying participant. The system also includes a root certificate authority that issues digital certificates to the issuing and relying participants.

At the time of a transaction, the buyer creates a hash of the transaction data, signs the hash, and transmits the transaction data, the signature, and its digital certificate to the seller. The seller may then request system services via a connection with its financial institution, the relying participant.

In a preferred embodiment, these system services may include a certificate status check service and a warranty service. The certificate status check service allows the relying customer to validate the subscribing customer's certificate. The warranty service allows the relying customer to receive a collateral-backed warranty that the subscribing customer's certificate is valid. Detailed message flows for providing these services are provided in the detailed description.

In a preferred embodiment, each participant and the root entity is provided with a transaction coordinator for combining services and operations into a single transaction having the qualities of atomicity, consistency, isolation, and durability. The transaction coordinator provides a single consistent interface for certificate-status messages and requests, as well as messages and requests relating to other services. As a result, the present invention provides the necessary flexibility to permit centralized and consistent capture of transactional information relating to a plurality of offered services for audit and non-repudiation purposes. In addition, the present invention facilitates the integration of additional services and provision of those services to customers.

The disclosed transaction coordinator provides a single interface to facilitate electronic communications amongst banks or other financial institutions or between banks or other financial institutions and their customers. The transaction coordinator also provides a single entry point for customers to obtain certificate-check services and provides the flexibility to add new business application services, such as warranty service, payment guarantee service, or certified mail service, while still providing a single entry point for these additional services. It is preferably designed to be easily extended to support additional services as they are created.

The disclosed transaction coordinator provides parsing, flow control, and error handling for the present messaging infrastructure and acts as a message switch to route message components to an appropriate system service (e.g., to an OCSP responder, warranty engine, etc.). In addition, it collates responses from these services into a consolidated response and dispatches the responses to requesting clients.

The disclosed transaction coordinator also records billing data for the certificate check service or other services in a centralized general fashion. Because all of the banks and other financial institutions have their own requirements for billing, the billing data can be extracted and modified to an individual financial institution's needs by writing simple extraction functions.

The disclosed transaction coordinator also allows banks or other financial institutions to cross-charge each other for different types of transactions as needed. Further, the disclosed transaction coordinator allows for the integration of commercial off-the-shelf software applications and provides a single electronic signing service to electronically sign and verify documents.

In addition, the disclosed transaction coordinator isolates all core services, thereby promoting reuse of components and simplifying the maintenance and enhancements of these services. The disclosed transaction coordinator does not require changing the on-line certification check functionality that would render it non-standard and might result in vendor locking and implementation delays.

BRIEF DESCRIPTION OF THE DRAWINGS

These and other objects, features, and advantages of the present invention will be better understood when taken in conjunction with the following detailed description and accompanying drawings in which:

FIG. 14 is a composite block/flow diagram that depicts the transaction flows for an OCSP-proxy centric embodiment of the present system.

DETAILED DESCRIPTION OF THE PREFERRED EMBODIMENTS

The present disclosure relates to a system that allows financial institutions to securely perform electronic certificate status checks and other services for their customers. In a preferred embodiment, the disclosed system employs a four-corner trust model to provide these services. A preferred embodiment of the four-corner model employed by the present system is shown in FIG. 1.

Figure 1:
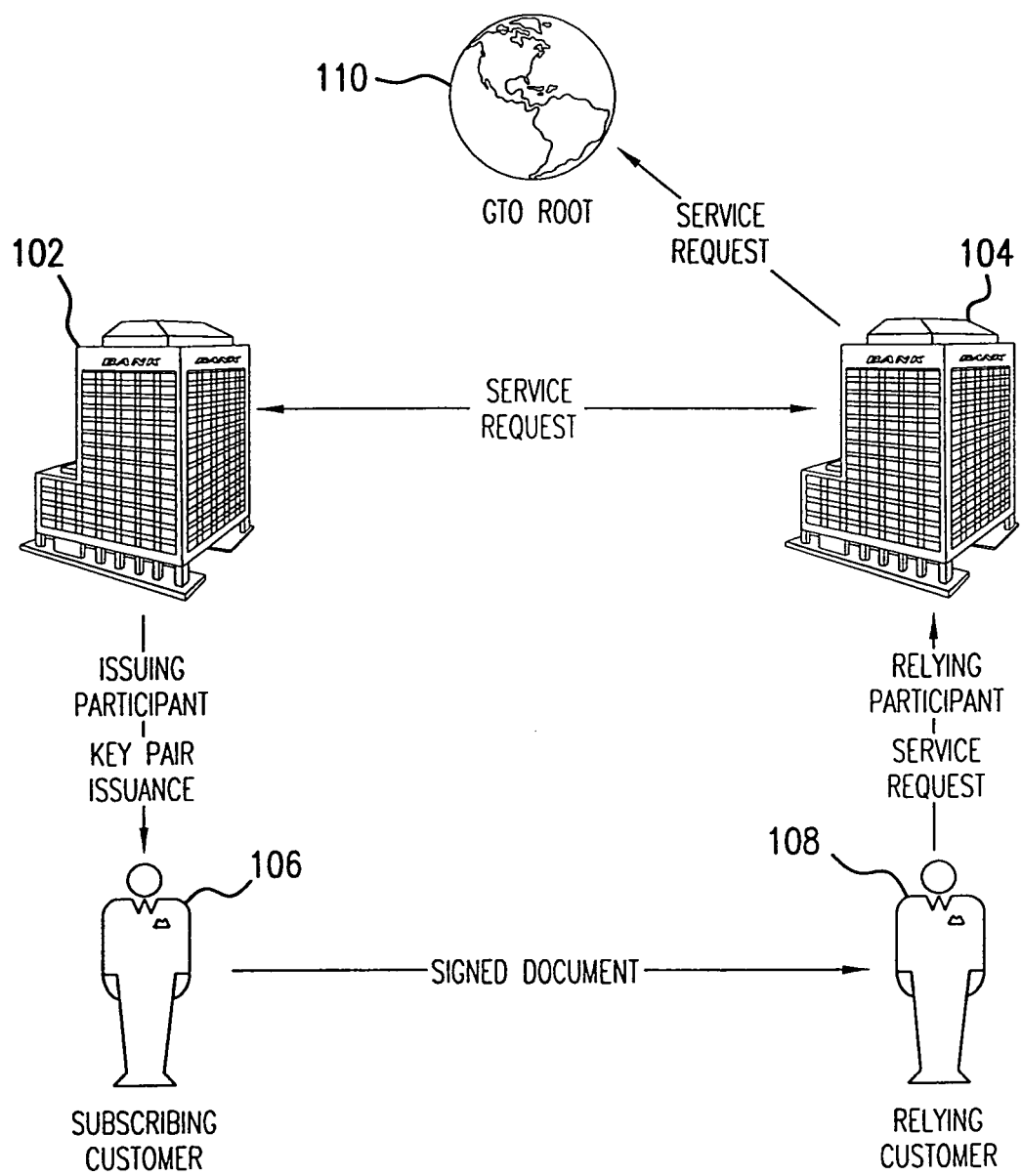
FIG. 1 is a block diagram of a preferred embodiment of the four-corner model employed by the present system.

As shown in FIG. 1, the four-corner model comprises a first institution 102 and a second institution 104. First institution 102 is referred to as the "issuing participant" because it is a participant in the present system and issues smart cards to its customers, as described below. Second institution 104 is referred to as the "relying participant" because it is a participant in the present system and its customers rely on representations made by issuing participant 102 and issuing participant 102's customers, as described below. Participants 102, 104 are typically banks or other financial institutions.

Also shown in FIG. 1 are a first customer 106, and a second customer 108. First customer 106 and second customer 108 are preferably customers of issuing participant 102 and relying participant 104, respectively. First customer 106 is referred to as the "subscribing customer" because it subscribes to services provided by issuing participant 102. Second customer 108 is referred to as the "relying customer" because it relies on representations made by both issuing participant 102 and subscribing customer 106.

Also shown in FIG. 1 is a root entity 110. Root entity 110 is typically an organization that establishes and enforces a common set of operating rules for facilitating electronic commerce and electronic communications. Root entity 110 may be owned jointly by a plurality of banks and/or other financial institutions that have agreed to adhere to these operating rules. One exemplary embodiment of such a root entity is described in copending application Ser. No. 09/502,450, filed Feb. 11, 2000, entitled System and Method for Certification-Related and Other Services, which is hereby incorporated by reference.

Figure 2:
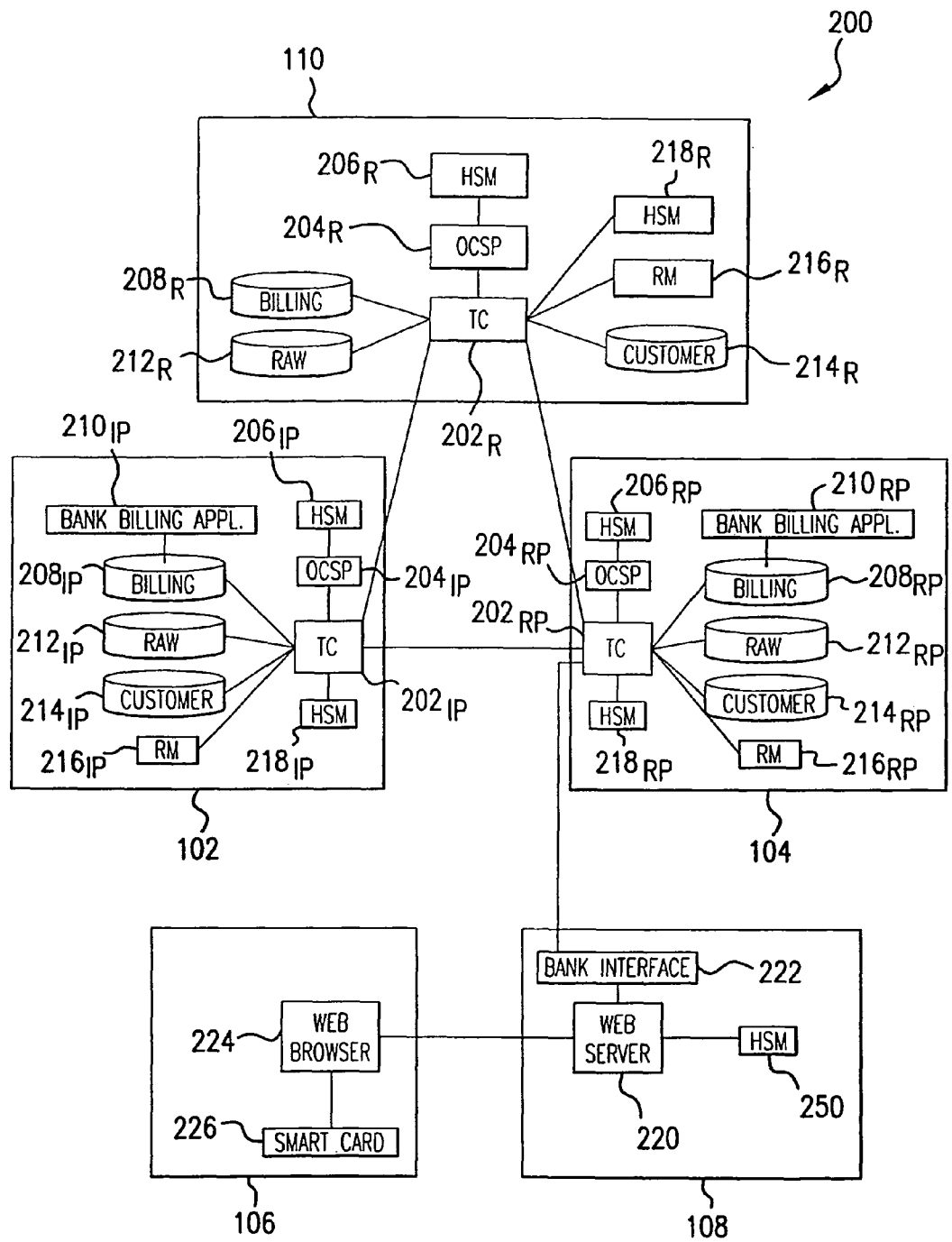
FIG. 2 is a block diagram depicting components preferably provided at entities in the four-corner model.

FIG. 2 is a block diagram depicting components preferably provided at entities in the four-corner model. As shown in FIG. 2, participants 102, 104 and root entity 110 are each provided with a transaction coordinator 202 that serves as a gateway for transmitting and receiving all inter-entity messages related to services provided by the present system. As described in more detail below, transaction coordinators 202 provide a single interface to issuing participant 102's and relying participant 104's on-line services, and implement safeguards necessary to ensure secure electronic communications between transaction coordinators 202 and other entities in the four-corner model. One preferred embodiment of a transaction coordinator 202 is described below in connection with FIGS. 3-6.

Participants 102, 104 and root entity 110 are each further preferably provided with an OCSP responder 204 and hardware security module (HSM) 206. Exemplary requirements for an OCSP responder 204 are described below. HSM 206 is adapted to sign messages and verify signatures on messages, as described below, in connection with FIG. 6.

In addition, each participant 102, 104 and root entity 110 is further preferably provided with a billing data database 208 (connected to a bank billing application 210 in the case of participants 102, 104), a raw transaction log, 212, a customer data database 214, a risk manager 216 (connected to customer data database 214), and a second hardware security module 218, each of which is connected to transaction coordinator 202.

As further shown in FIG. 2, relying customer 108 is preferably provided with a Web server 220 that is adapted to receive and transmit information via the Internet. Relying customer 108 is further preferably provided with a bank interface 222 for communicating with relying participant 104, as described in more detail below. One preferred embodiment of bank interface 222 (as well as additional components preferably provided at the relying customer) is described in copending U.S. patent application Ser. No. 09/657,604, filed Sep. 8, 2000, entitled System and Method for Facilitating Access By Sellers to Certificate-Related and Other Services, which is hereby incorporated by reference. Relying customer 108 is preferably further provided with a hardware security module 230 for signing and verifying system messages.

As further shown in FIG. 2, subscribing customer 106 is preferably provided with a Web browser 224 for browsing the Internet and a smart card 226 (and associated reader) for signing digital messages, as described below.

In a preferred embodiment, each system entity is provided with two digital certificates (and corresponding private keys) to facilitate authentication: An identity certificate (also referred to, in some cases, as a warranty certificate) and a utility certificate. In addition, in a preferred embodiment, each transaction coordinator 202 is preferably provided with its own identity certificate and utility certificate and associated private keys.

The identity private key is used to produce digital signatures that are required by root entity 110 as evidence of an entity's contractual commitment to the contents of an electronic transaction. A certificate chain is needed to support operations using this key. The status of the identity certificate may be obtained by authorized entities, as described below.

The utility private key is used to produce digital signatures that allow additional transactional security. Typically, utility certificates are used to support secure socket layer sessions, to sign S/MIME messages, and for other utility applications. A certificate chain is also needed to support operations using the utility key. The status of the utility certificate, however, may not be available to a requestor. Throughout this document, the term "certificate" refers to an identity certificate unless otherwise stated.

In a preferred embodiment, subscribing customer 106's digital certificates and associated private keys are provided to it by issuing participant 102. Issuing participant 102 preferably issues smart cards or other suitable instruments to subscribing customer 106 that include at least the private key associated with the subscribing customer's identity certificate. If desired, the smart card may also include the subscribing customer's identity certificate. Preferred specifications for the smart card, its manufacture, and contents are described in U.S. provisional patent application Ser. No. 60/224,994, filed Aug. 14, 2000, entitled Signing Interface Requirements, Smart Card Compliance Requirements, Warranty Service Functional Requirements, and Additional Disclosure, which is hereby incorporated by reference.

Figure 3:
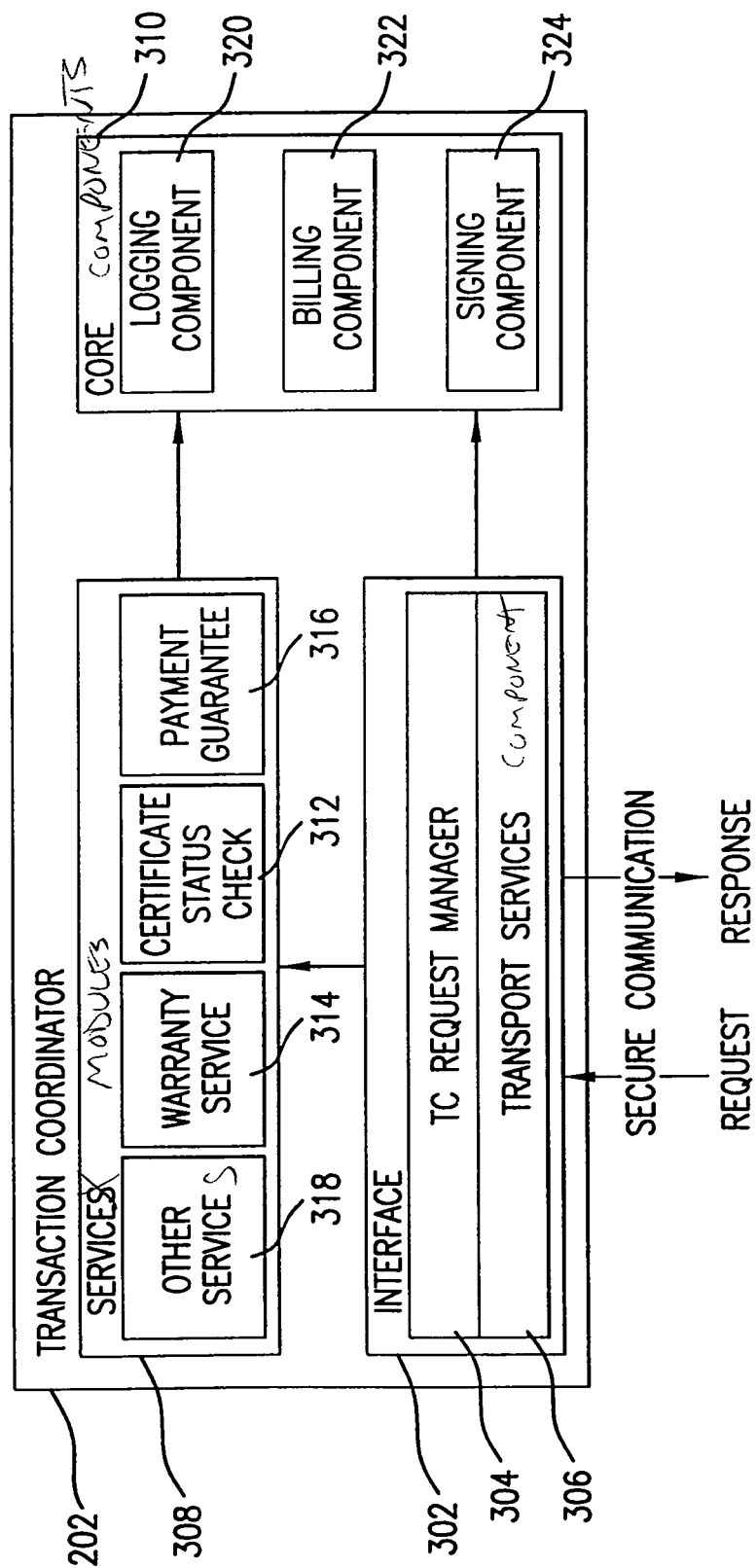
FIG. 3 is a block diagram of a preferred embodiment of a transaction coordinator.

FIG. 3 is a block diagram of a preferred embodiment of a transaction coordinator 202. As shown in FIG. 3, transaction coordinator 202 preferably comprises an interface 302 comprising two components: a TC request manager 304 and a transport services component 306. Interface 302 passes communications to and from a plurality of service modules 308 and core components 310. Service modules 308 preferably include a certificate status check module 312, warranty service module 314, a payment guarantee module 316, and may comprise other service modules 318 for providing additional services. Core components 310 preferably include a logging component 320, a billing component 322, and a signing component 324.

Transport services component 306 provides a single entry point into the transaction coordinator and acts as an isolation layer between a requestor and the transaction coordinator's service modules and core components. Request manager 304 receives service requests from transport services component 306 and forwards them to appropriate service modules and/or core components, as described in more detail below.

The function of certificate status check service 312 is to validate the certificates of entities within system 200 of FIG. 2. The function of warranty service 314 is to guarantee the identity of an entity that signs an electronic communication relating to a particular business transaction. In a preferred embodiment, the participant providing the warranty, typically issuing participant 102, accepts financial responsibility for some or all of the transaction amount if it is later discovered that subscribing customer 106 did not execute a digital signature created with the subscribing customer's private key.

The function of payment guarantee service 316 is to further decrease the risk associated with a transaction by providing relying customer 108 with immediate confirmation of subscribing customer 106's ability to fulfill a financial obligation. In addition, issuing participant 102 may issue a payment guarantee for some or all of the transaction amount if for some reason subscribing customer 106 fails to pay relying customer 108. Payment services may also be established as described in copending U.S. patent application Ser. No. 09/657,622, filed Sep. 8, 2000, entitled System and Method for Providing Payment Services in Electronic Commerce, which is hereby incorporated by reference.

The function of certified mail service 318 is to support off-line transactions. Off-line transactions occur when the receiving entity, instead of servicing the request immediately, puts the request in a processing queue. Typically, an acknowledgment of receipt is sent to the requestor. This scenario may preferably be implemented when the transaction volumes are so large that it is not feasible to provide on-line responses to every request. Certified mail service 318 may preferably be used to satisfy requests between relying customer 108 and relying participant 104, relying participant 104 and issuing participant 102, and any request made to root entity 110.

The function of logging component 320 is to log all service requests and OCSP responses in a raw transaction log 58 (see FIG. 5) for non-repudiation and security auditing purposes.

The function of billing component 322 is to create and store a transaction billing history for messages (responses and requests) received by transaction coordinator 202. Preferred operation of these modules and components is further described below.

Figure 4:
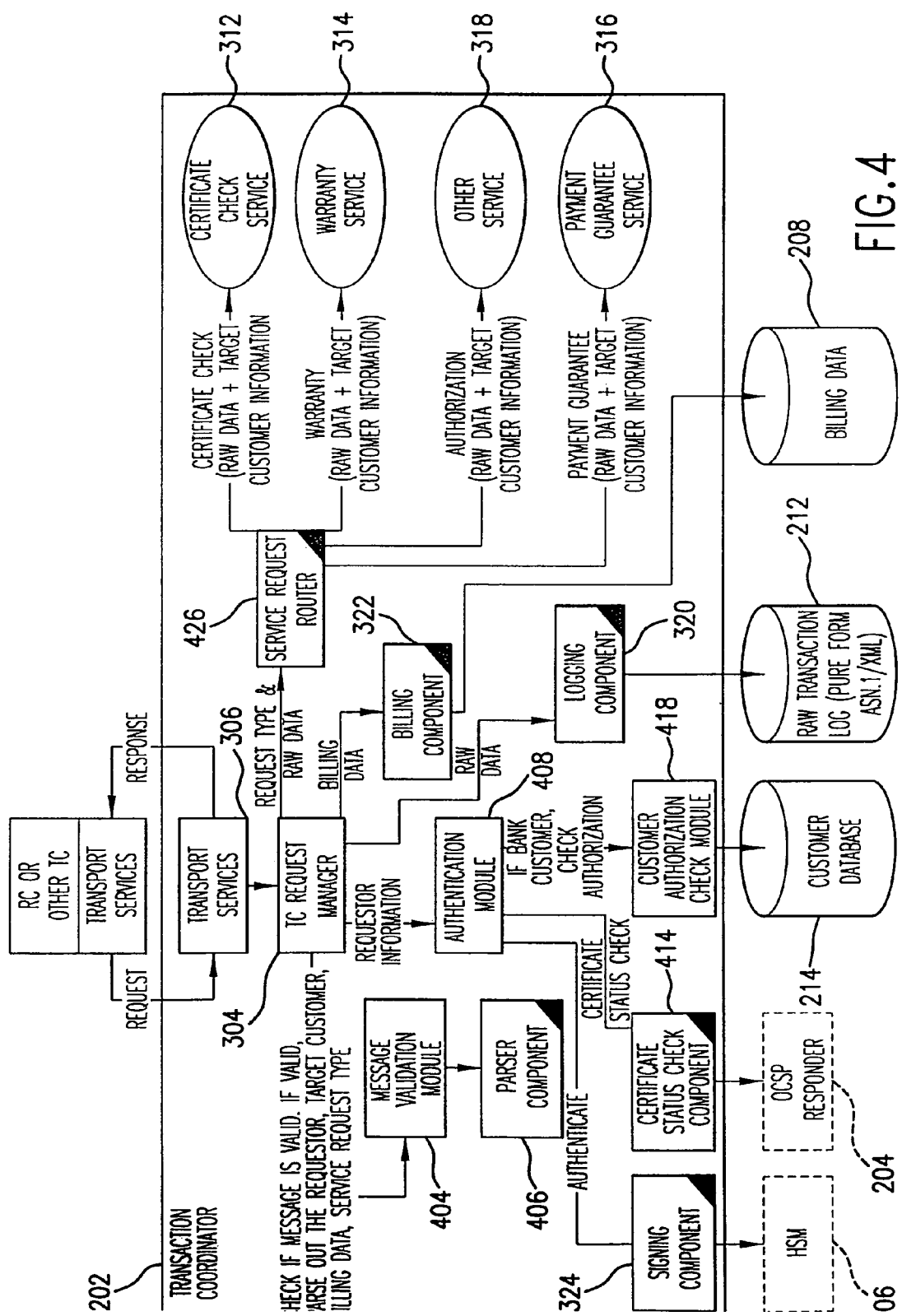
FIG. 4 is a composite block/flow diagram that demonstrates certain aspects of transaction coordinator operation in a preferred embodiment.

FIG. 4 is a composite block/flow diagram that demonstrates certain aspects of transaction coordinator operation in a preferred embodiment. As shown in FIG. 4, in step 4002, transport services component 306 of transaction coordinator 202 receives a service request from another system entity and sends the service request to request manager 304. In step 4004, request manager 304 checks to see if the service request format is valid. If the service request format is valid, request manager 304 requests information on the requester, the billing data, and the service request type by calling a message validation module 404. Message validation module 404 calls a parser component 406 to extract the relevant information from the raw service request.

In step 4006, request manager 304 calls an authentication module 408 to authenticate the requestor. Authentication module 408 is described in more detail below.

In step 4008, authentication module 408 authenticates the requester by calling signing component 324 of transaction coordinator 202 which, in turn, calls hardware security module 218. A preferred structure and operation for signing component 324 is described in more detail below.

In step 4010, authentication module 408 calls certificate status check component 414 that in turn calls an OCSP responder 204 to perform a certificate status check on the requester. A preferred structure and operation for certificate status check component 414 is described in more detail below.

In step 4012, authentication module 408 calls a customer authorization check module 418 to verify that the requestor is authorized to place the service request. A preferred structure and operation for customer authorization check module 418 is described in more detail below.

In step 4014, request manager 304 calls logging component 320 to log the raw service request for non-repudiation purposes. In a preferred embodiment, messages stored in the raw transaction log are stored in either ASN.1 or XML format.

In step 4016, request manager 304 forwards any billing data necessary to appropriately bill for services provided to billing component 322 to for logging in the billing log.

In step 4018, request manager 304 forwards the service request to a service request router 426. In step 4020, service request router 426 calls an appropriate service module 308 to fulfill the request.

In step 4022, a service response is received by service request router 426 from the service module that was called in step 4020. Service request router 426 forwards the service response back to request manager 304 which, in turn, sends the service response to transport services components 306. Transport services component 306 forwards the service response to the entity that made the service request.

Figure 5:
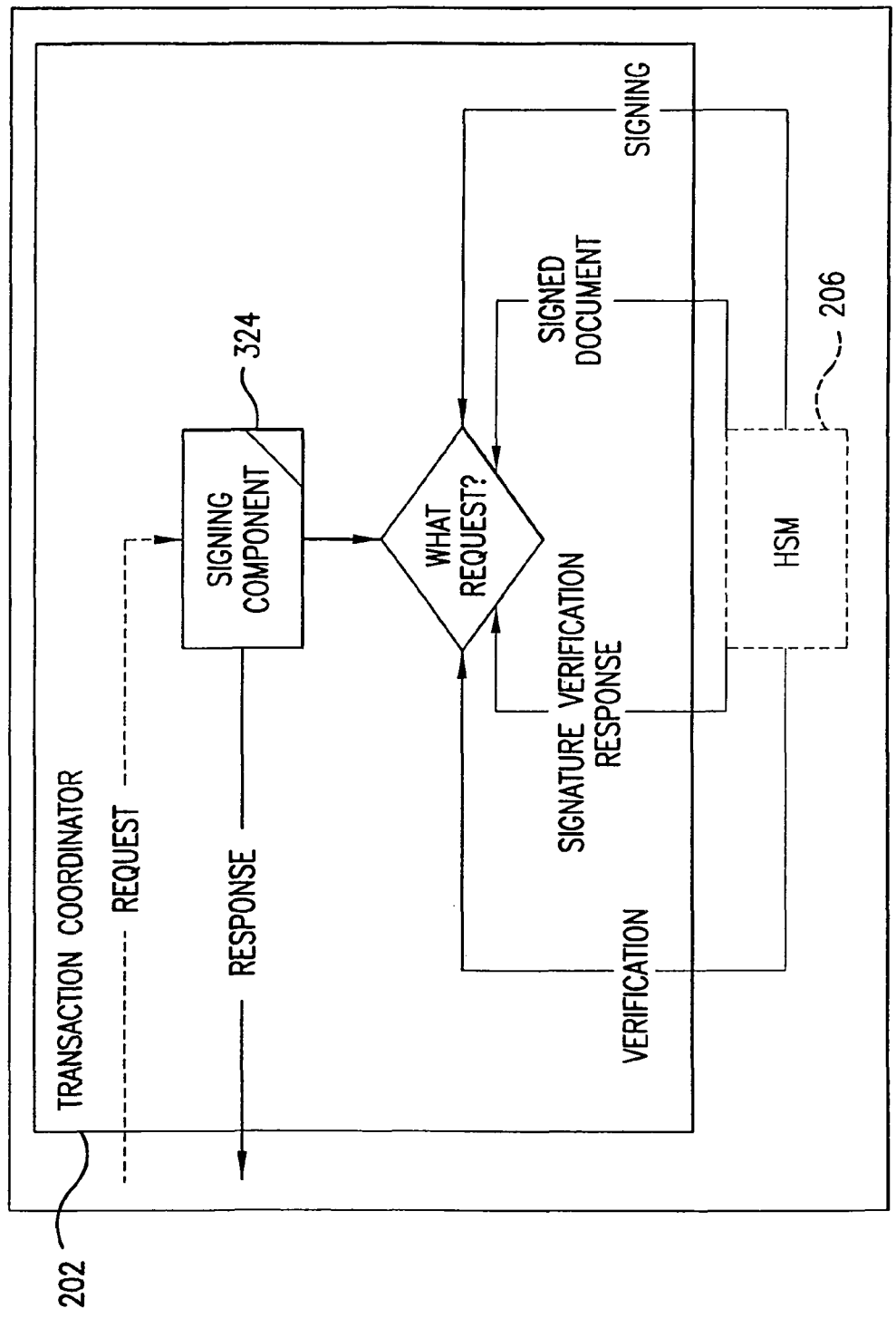
FIG. 5 is a composite block/flow diagram depicting preferred operation of the signing component of a transaction coordinator.

FIG. 5 is a composite block/flow diagram depicting preferred operation of signing component 324. Signing component 324 preferably provides a single interface to different signing devices, such as smart cards and hardware security modules, and uses cryptographic processing to verify signatures.

Turning to FIG. 5, when a request is received by signing component 324 in step 5002, signing component 324 determines whether it is a request for signature or for verification. If the request is for verification, signing component 324 sends the request to a hardware security module 218 for verification (step 5004). In step 5008, hardware security module 218 responds to this request with a signature verification response to signing component 60.

If the request is to sign a document, signing component 324 sends the request (which should include the document to be signed) to hardware security module 218 for signature (step 5006). In step 5010, hardware security module 218 responds to this request by signing the document and returns the signed document to signing component 324. Finally, in step 5012, signing component 324 returns the signature-verification response or signed document to the component that made the request.

Figure 6:
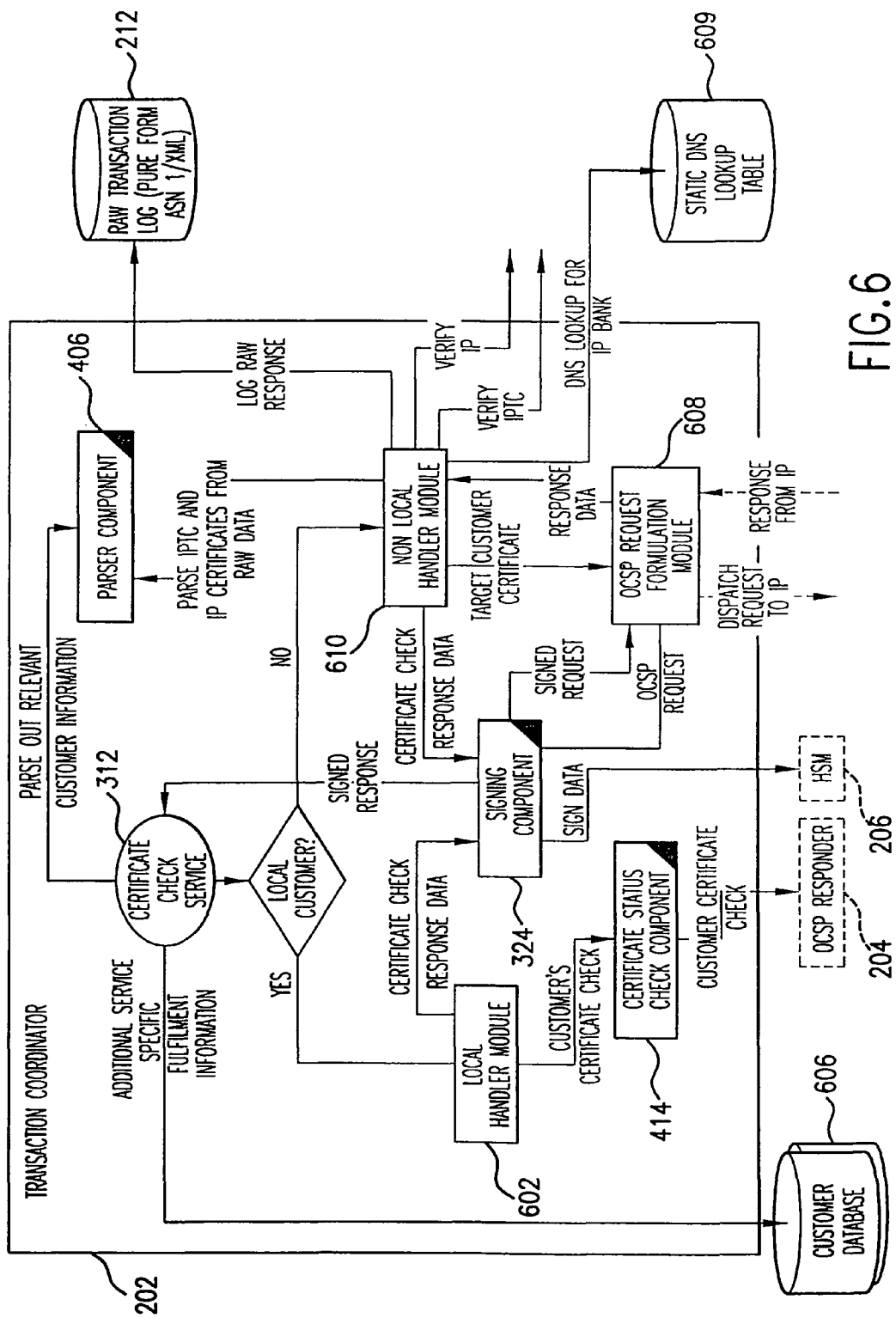
FIG. 6 is a composite block/flow diagram demonstrating a preferred embodiment of the steps performed by a transaction coordinator in performing a certificate status check.

FIG. 6 is a composite block/flow diagram demonstrating a preferred embodiment of the steps performed by a transaction coordinator 202 in performing a certificate status check. In step 6002, certificate check service module 312 receives an unparsed certificate status check request from service router 426 and forwards it to a parser component 406 that extracts the relevant customer information (comprising the certificate to be checked) from the request. In step 6004, certificate check service module 312 obtains any additional service-specific fulfillment information from a customer database 606.

In step 6006, if the certificate to be checked belongs to a customer of the participant whose transaction coordinator 202 received the request, certificate check service module 312 hands the request off to a local-customer handler 602. Otherwise, certificate check service module 312 hands the request off to a non-local-customer handler 610.

In those cases where local-customer handler 602 handles the request, the system proceeds to step 6008, where local customer handler 602 sends a certificate check request to a certificate status check component 312. Certificate status check component 312 then obtains a certificate status for the certificate to be checked from its associated OCSP responder 204 (i.e., the OCSP responder 204 belonging to the same transaction coordinator 202 as certificate status check component 312). Flow in these cases then continues with step 6032 below.

In contrast, in those cases where the certificate to be checked does not belong to a customer of the participant who received the request, then, in step 6010, non-local-customer handler 610 looks up the IP address of the issuing participant that issued the certificate that is the subject of the request in a static DNS table 604. Transaction coordinator $202_{RP}$ is preferably adapted to use the AIA extension in a certificate to identify the location of issuing participant 102. In step 6012, non-local-customer handler 610 forwards the subject certificate to an OCSP request formulation module 608. In step 6014, OCSP request formulation module 608 formulates an OCSP request for the certificate and sends the request to signing component 324 for signature. In step 6016, signing component 324 returns the signed request.

In step 6018, OCSP request formulation module 608 sends the signed request to the issuing participant 102 that issued the subject certificate. In step 6020, that issuing participant 102 returns an OCSP response to the request to OCSP request formulation module 608.

In step 6022, OCSP request formulation module 608 forwards the response to non-local-customer handler 610. In step 6024, non-local-customer handler 610 logs the raw response data to raw transaction log 212 for non-repudiation purposes.

In step 6026, non-local-customer handler 610 sends the raw response data to parser component 406 to extract the certificates of issuing participant 102 and its transaction coordinator $202_{IP}$ from the response.

In step 6028, non-local-customer handler 610 validates the issuing participant's transaction coordinator certificate by repeating steps 6012-6024 but transmitting the OCSP request created in step 6014 to root entity 110 rather than issuing participant 102.

Similarly, in step 6030, non-local-customer handler 610 validates the issuing participant's certificate by repeating steps 6012-6024 but transmitting the OCSP request created in step 6014 to root entity 110 rather than issuing participant 102.

In step 6032, the certification check response data received by non-local-customer handler 610 or generated by local-customer handler 602 is sent to signing component 324 which signs the response. In step 6034, the signed response is sent back to certificate check service module 312 which, in turn, transmits the response to service request router 426.

Figure 7A:
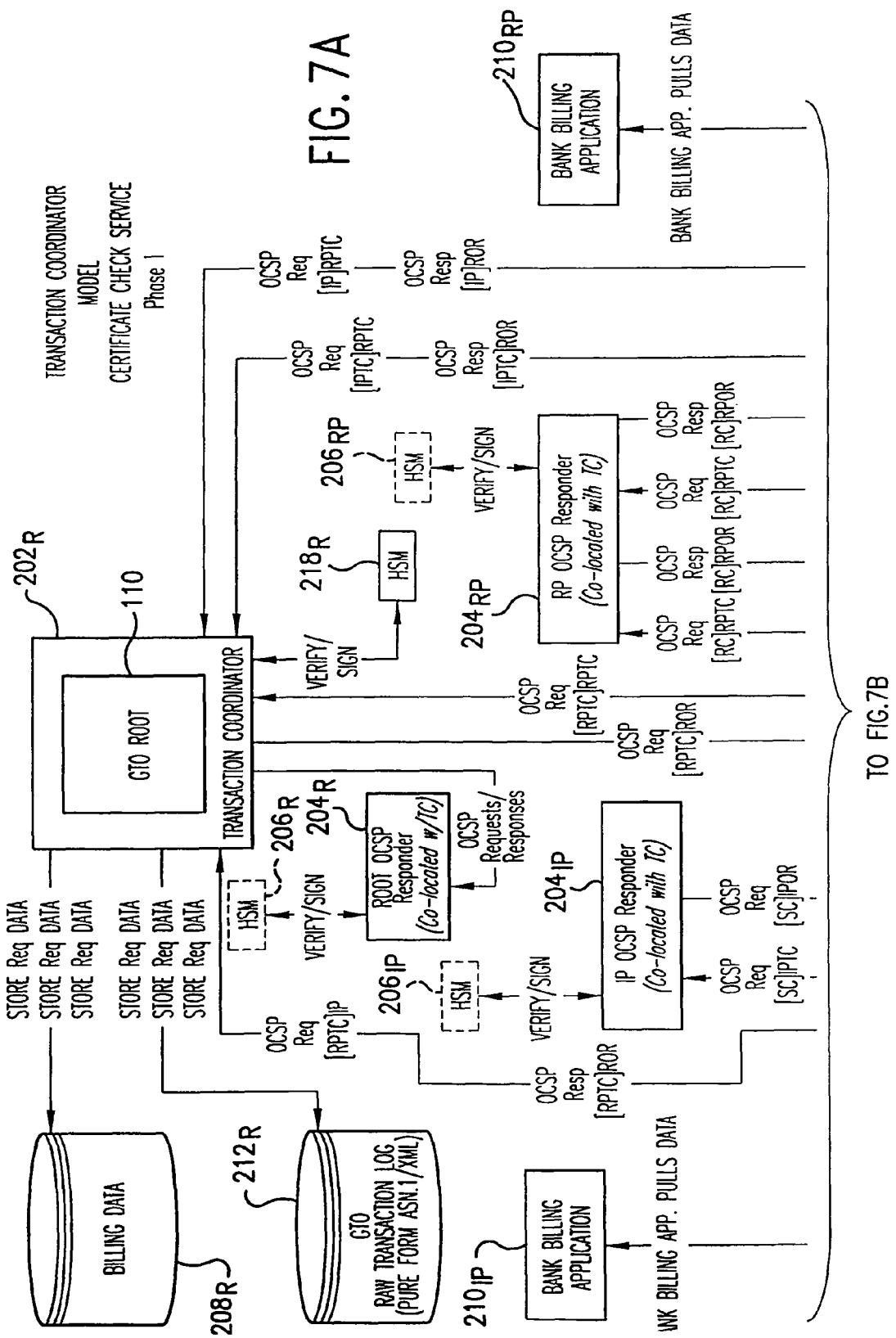
FIG. 7 is a composite block/flow diagram illustrating a preferred embodiment of the transaction flow for validating a certificate.

FIG. 7 is a composite block/flow diagram illustrating a preferred embodiment of transaction flow within system 200 for validating a certificate. As shown in FIG. 7, in step 7002, subscribing customer 106 creates a hash of data representing a transaction between subscribing customer 106 and relying customer 108 and sends the hash to smart card 226 for signature. In step 7004, smart card 226 signs the data and returns the signed data along with the certificate of subscribing customer 106 and issuing participant 102.

In step 7006, subscribing customer 106 sends the signed data and the two certificates to relying customer 108. In step 7008, relying customer 108 verifies the signature on the data sent by subscribing customer 106. This verification preferably includes checking the validity period of the received certificates. Alternatively, verification may be provided as a service to relying customer 108 by relying participant 104. Relying customer 108 then creates an OSCP request containing the subscribing customer's and issuing participant's certificates and transmits the request to hardware security module 230 for signature. In step 7010, hardware security module 230 returns the signed request.

In step 7012, relying customer 108 transmits the signed OCSP request to relying participant 104, along with its own certificate. In step 7014, transaction coordinator $202_{RP}$ of relying participant 104 receives the signed OCSP request and checks customer database $214_{RP}$ to make sure that the request was signed by an existing relying customer before processing the request. In a preferred embodiment, a relying participant 104 does not process requests received from a customer of a different participant. In step 7016, transaction coordinator $202_{RP}$ stores the raw transaction data (i.e., the unparsed request, signature, and accompanying relying customer certificate) in raw transaction log $212_{RP}$. In step 7018, any billing data necessary to appropriately bill for services provided is stored in billing log $208_{RP}$. Alternatively, billing data may be extracted from the raw-transaction log by an off-line process to increase system performance.

In step 7020, transaction coordinator $202_{RP}$ verifies the relying customer's signature on the service request using the relying customer's certificate, the relying participant's certificate, and the root public key. The relying participant's certificate and the root public key may preferably be stored in hardware security module $218_{RP}$.

In step 7022, transaction coordinator $202_{RP}$ generates an OCSP request containing the relying customer's certificate, signs it, and sends it to its OSCP responder 204. Alternatively, if the transaction coordinator and OCSP responder are co-located, a signature on the request may not be necessary. In step 7024, OCSP responder 204 verifies the signature of the request, checks its local repository to determine the validity of its relying customer's certificate, and sends a response back concerning that certificate's status to transaction coordinator $202_{RP}$.

It should be noted that, as part of system operation, relying customers 108 will often need to validate the certificate of a subscribing customer 106 that is a customer of a participant other than relying participant 104. Because, in that case, relying participant 104 is not the issuing participant that issued the certificate to be validated, it does not have first hand knowledge of that certificate's status.

In a preferred embodiment, the present system addresses this problem by having each participant that receives an OCSP request for a certificate issued by another participant, forward the request to the issuing participant for that certificate. In particular in step 7026, relying participant 104 determines the subscribing customer's issuing participant. If the subscribing customer is a customer of a different participant, relying participant 104 generates a signed validation request for the subscribing customer's certificate and sends it to the identified issuing participant 102 along with its own certificate. Alternatively, rather than sign the validation request, the relying participant may instead provide client-side authentication to issuing participant 102 as, for example, in the OCSP-proxy centric model described below.

If the subscribing customer and the relying customer are both customers of the same participant, validation of the subscribing customer's certificate is handled by local-handler module 602, as described above.

In step 7028, issuing participant 102 checks its customer database $214_{IP}$ to make sure that the request was signed by an entity authorized to make the request. In step 7030, issuing participant 102 stores the received raw transaction (i.e., the unparsed request, signature, and accompanying certificate) in its raw transaction log $212_{IP}$. In step 7032, issuing participant 102 stores relevant billing data for the request in its billing log 208. Alternatively, billing data may be extracted from the raw-transaction log by an off-line process to increase system performance.

In step 7034, issuing participant 102 verifies transaction coordinator $202_{RP}$'s signature on the request using the relying participant's transaction coordinator certificate (sent with the request) and the root public key (which may be stored in hardware security module $218_{IP}$). In step 7036, the issuing participant's transaction coordinator $202_{IP}$ generates a signed OCSP request for the relying participant's transaction coordinator certificate and sends the request to root entity 110.

In step 7038, transaction coordinator $202_R$ of root entity 110 receives the request and stores the raw request in its raw transaction log $212_R$. In step 7040, transaction coordinator $202_R$ stores billing data for the request in billing data log $208_R$. In step 7042, transaction coordinator $202_R$ verifies the signature on the request and then sends the request to OCSP responder $204_R$. In step 7044, OCSP responder $204_R$ checks its local repository to determine the status of the subject certificate and sends a response back concerning its status to transaction coordinator $202_R$. In step 7046, transaction coordinator $202_R$ sends a signed response to transaction coordinator $202_{IP}$ indicating the status of the relying participant's transaction coordinator certificate.

In step 7048, transaction coordinator $202_{IP}$ of issuing participant 102 stores the OCSP response from root entity 110 in raw transaction log $212_{IP}$ for non-repudiation purposes. In step 7050, transaction coordinator $202_{IP}$ generates an OCSP request for the subscribing customer's certificate, signs it, and sends it to its own local OCSP responder $204_{IP}$ along with its own certificate. Alternatively, if transaction coordinator $202_{IP}$ and OCSP responder $204_{IP}$ are co-located, a signature on the request may not be necessary. Also, if the two are co-located, the transaction coordinator may simply act as a pass through, as opposed to re-signing requests and responses.

In step 7052, OCSP responder $204_{IP}$ verifies the signature on the request, generates a response, signs it, and returns the signed response to transaction coordinator $202_{IP}$. In step 7054, transaction coordinator $202_{IP}$ verifies the OCSP responder's signature, resigns the response, and returns it to transaction coordinator $202_{RP}$ along with its own certificate.

In step 7056, transaction coordinator $202_{RP}$ of relying participant 104 stores the raw response data received from issuing participant 102 in raw transaction log $212_{RP}$ for non-repudiation purposes. In step 7058, transaction coordinator $202_{RP}$ verifies the signature of transaction coordinator $202_{IP}$ on the response using the issuing participant's transaction coordinator certificate (sent with the request) and the root public key (which may be stored in hardware security module $218_{RP}$). In step 7060, transaction coordinator $202_{RP}$ generates a signed OCSP request for the issuing participant's transaction coordinator certificate and sends it to root entity 110.

In step 7062, transaction coordinator $202_R$ of root entity 110 stores the raw request data in raw transaction log $212_R$. In step 7064, transaction coordinator $202_R$ stores relevant billing data in billing log $208_R$. In step 7066, transaction coordinator $202_R$ verifies the signature on the request and sends the request to OCSP responder $204_R$. In step 7068, OCSP responder $204_R$ checks its local repository to determine the status of the issuing participant's transaction coordinator certificate and sends a response back concerning its status to transaction coordinator $202_R$. In step 7070, transaction coordinator $202_R$ sends a signed response concerning the status of the subject certificate to transaction coordinator $202_{RP}$.

In step 7072, transaction coordinator $202_{RP}$ of relying participant 104 stores the response in raw transaction log $212_{RP}$ for non-repudiation purposes. At this point, processing of the subscribing customer's certificate is complete.

In step 7074, transaction coordinator $202_{RP}$ now processes the second half of the request: the issuing participant's certificate, by generating a signed OCSP request for the issuing participant's certificate and sending it to root entity 110.

In step 7076, transaction coordinator $202_R$ of root entity 110 stores the raw request data in raw transaction log 212. In step 7078, transaction coordinator $202_R$ stores relevant billing data in billing log 208.

In step 7080, transaction coordinator $202_R$ verifies the signature on the request and sends the request to OCSP responder $204_R$. In step 7082, OCSP responder $204_R$ checks its local repository to determine the status of the subject certificate and sends a response back to transaction coordinator $202_R$. In step 7084, transaction coordinator $202_R$ sends a signed response to transaction coordinator $202_{RP}$.

In step 7086, transaction coordinator $202_{RP}$ of relying participant 104 stores the response from root entity 110 in raw transaction log $212_{RP}$ for non-repudiation purposes. In step 7088, transaction coordinator $202_{RP}$ creates an OCSP response from the responses received from transaction coordinator $202_{IP}$ of issuing participant 102 and its local cache, signs it, and sends it to relying customer 108 along with its own certificate.

In step 7090, relying customer 108 verifies the response using the root's public key certificate stored in hardware security module 230. In step 7092, relying customer 108 sends a request to transaction coordinator $202_{RP}$ for the relying participant's transaction coordinator certificate in order to determine if that certificate has been revoked. In step 7094, transaction coordinator $202_{RP}$ verifies the signature on the request and sends a request to local OCSP responder $204_{RP}$ to ensure that the relying customer's transaction coordinator certificate has not been revoked. In step 7096, local OCSP responder $204_{RP}$ responds to this request from transaction coordinator $202_{RP}$.

In step 7098, transaction coordinator $202_{RP}$ sends an OCSP request for the relying participant's transaction coordinator certificate to transaction coordinator $202_R$ of root entity 110. In step 7100, transaction coordinator $202_R$ verifies the signature on the request and checks with local OCSP responder $204_R$ to determine the status of the relying participant's transaction coordinator certificate. In step 7102, transaction coordinator $202_R$ forwards the response received from local OCSP responder $204_R$ to transaction coordinator $202_{RP}$.

In step 7104, transaction coordinator $202_{RP}$ forwards the response received from root entity 110 to relying customer 108. In step 7106, relying customer 108 provides acknowledgment to subscribing customer 106.

In connection with steps 7092-7104 above, it should be noted that, as part of system operation, relying customers 108 will typically need to obtain the status of relying participant 104's transaction coordinator certificate. Within the four-corner model, the transaction coordinator and OCSP responder certificates of issuing participant 102 and relying participant 104 are signed by root entity 110. While root entity 110 operates an OCSP responder, this service is accessible only to participants. Consequently, relying customer 108 cannot request validation of its relying participant's certificates directly from root entity 110.

In a preferred embodiment, the present system addresses this problem by having each participant 102, 104 operate a root responder proxy. This proxy accepts requests from customers on behalf of the root, typically through a different uniform resource locator, forwards the request to the root over an authenticated secure sockets layer channel, and returns the response (still signed by the root) to the requesting party.

The four-corner model described above may also be used to provide a warranty service that warranties the identity of a particular entity (e.g., the subscribing customer) that signed a transaction. One embodiment for providing such a warranty service is described below. Additional embodiments for providing warranty services are described in U.S. provisional patent application Ser. No. 60/224,994, filed Aug. 14, 2000, entitled Signing Interface Requirements, Smart Card Compliance Requirements, Warranty Service Functional Requirements, and Additional Disclosure, which is hereby incorporated by reference.

Figure 8A:
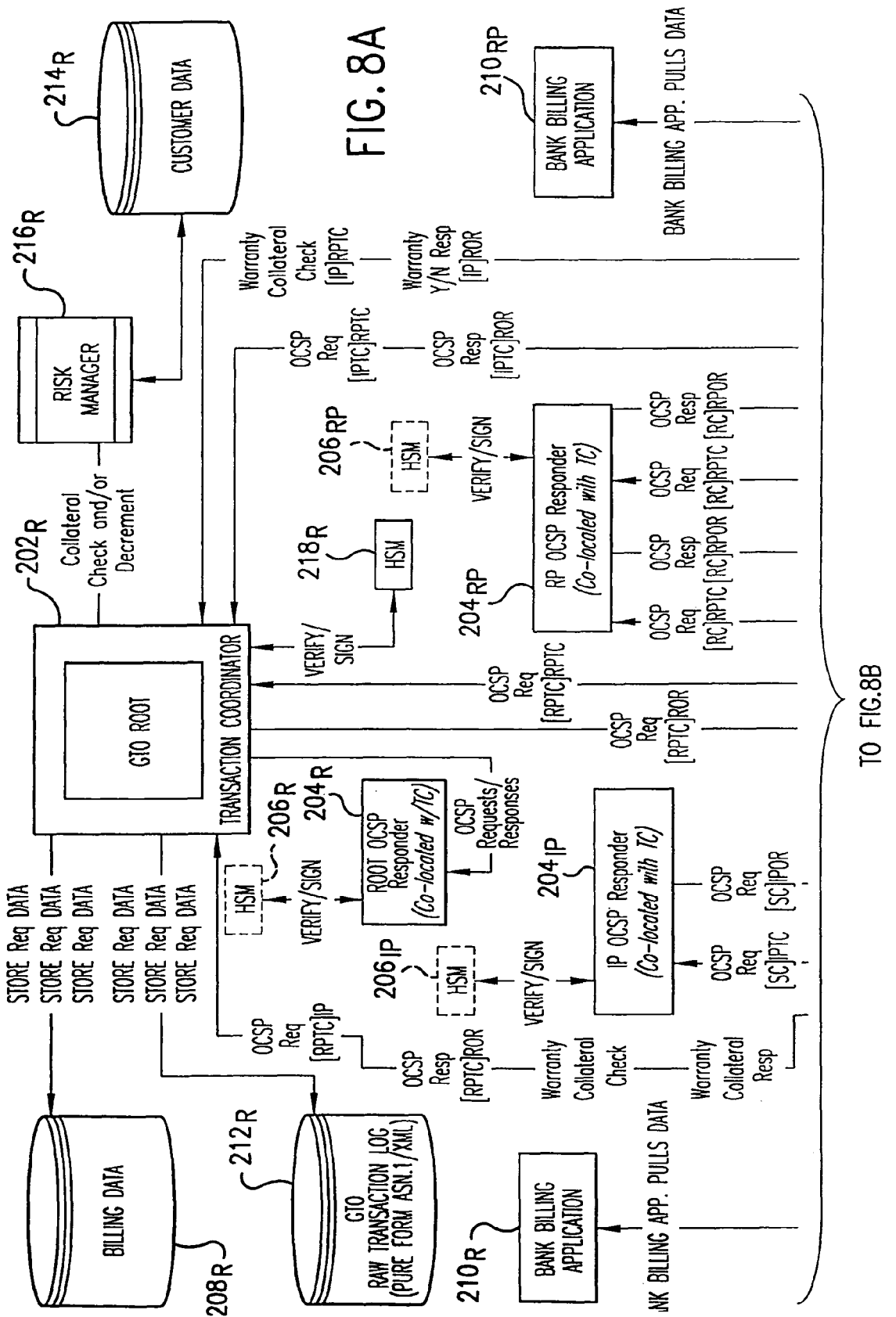
FIG. 8 is a composite block/flow diagram illustrating the transaction flow for one preferred embodiment of a warranty service.
Figure 8B:
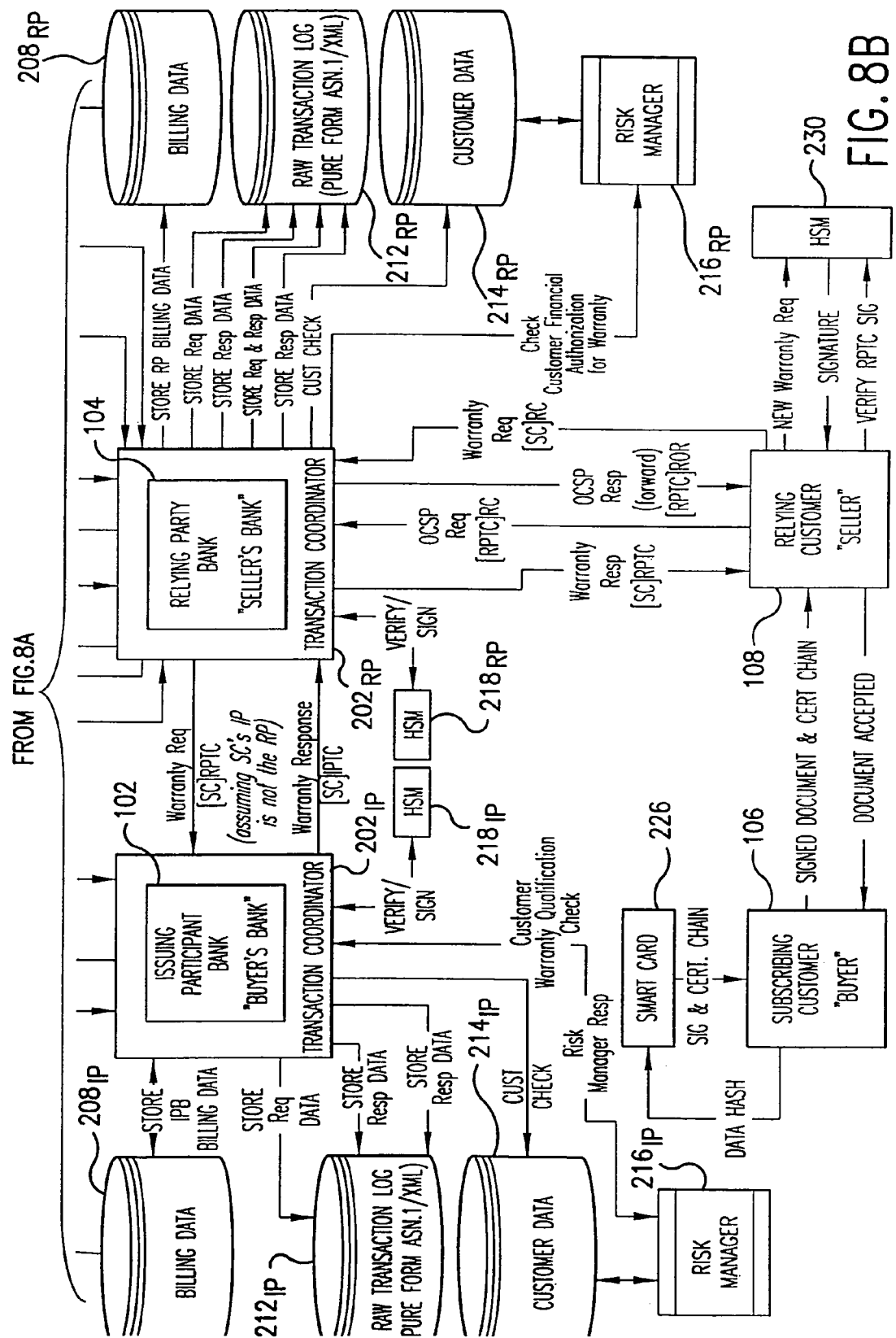

FIG. 8 is a diagram of the transaction flow for one preferred embodiment of a warranty service. As shown in FIG. 8, in step 8002, subscribing customer 106 creates a hash of date representing a transaction between subscribing customer 106 and relying customer 108 and sends the hash to smart card 226 for signature. In step 8004, smart card 226 signs the data and returns the signature along with the subscribing customer's certificate and the issuing participant's certificate. Optionally, this message may also include card and signature security data (CSSD) to inject additional security such as protection against duplicate messages.

In step 8006, subscribing customer 106 sends the signed data, the signature, the subscribing customer's certificate, and the issuing participant's certificate (and optionally the CSSD) to relying customer 108. In step 8008, relying customer 108 verifies the signature on the data sent by subscribing customer 106. Alternatively, verification may be provided as a service to relying customer 108 by relying participant 104. Relying customer 108 then creates a warranty request and transmits the request to hardware security module 230 for signature. In step 8010, hardware security module 230 returns the signed request along with a copy of the relying customer's certificate.

In step 8012, relying customer 108 sends the signed warranty request and relying customer certificate to relying participant 104.

In step 8014, transaction coordinator $202_{RP}$ of relying participant 104 checks customer database $214_{RP}$ to make sure that the request was signed by an existing customer before processing the request. In step 8016, transaction coordinator $202_{RP}$ stores the raw transaction data relating to the transaction (i.e., the "unparsed" request, signature, and accompanying certificate) in raw transaction log $212_{RP}$. In step 8018, transaction coordinator $202_{RP}$ stores relevant billing data in billing log $208_{RP}$. Alternatively, billing data may be extracted from the raw transaction log by an off-line process to increase system performance.

In step 8020, transaction coordinator $202_{RP}$ verifies the relying customer's signature on the request using the relying customer's certificate (sent with the request), the relying participant's certificate, and the root public key (both of which may be stored in hardware security module $218_{RP}$). Transaction coordinator $202_{RP}$ then generates an OCSP request containing the relying customer's certificate, signs it, and sends it to its local OCSP responder $204_{RP}$. Alternatively, if the transaction coordinator and OCSP responder are co-located, a signature on the request may not be necessary.

In step 8022, OCSP responder $204_{RP}$ verifies the signature on the request, check its local repository for the status of the relying customer's certificate, and sends a response concerning that status back to transaction coordinator $202_{RP}$.

In step 8024, transaction coordinator $202_{RP}$ calls a risk manager $216_{RP}$ to determine if relying customer 108 is financially authorized to make the warranty request. If it is, then, in step 8026, transaction coordinator $202_{RP}$ determines the participant responsible for responding to warranty requests concerning subscribing customer 106 (i.e., the participant of which subscribing customer 106 is a customer). In the present example, this entity is issuing participant 102. Transaction coordinator $202_{RP}$ then creates a warranty request for subscribing customer 106, signs it, and sends it to issuing participant 102 along with its own certificate. It should be noted that if the relying customer and subscribing customer are both customers of the same participant, the warranty request may instead be processed locally by the participant.

In step 8028, transaction coordinator $202_{IP}$ checks customer database $214_{IP}$ to make sure that the request was signed by an entity authorized to make the request. In step 8030, transaction coordinator $202_{IP}$ stores the raw transaction data (i.e., the "unparsed" request, signature, and accompanying certificate) in raw transaction log $212_{IP}$. In step 8032, transaction coordinator $202_{IP}$ stores relevant billing data for the request in the billing log $208_{IP}$. Alternatively, billing data may be extracted from the raw transaction log by an off-line process to increase system efficiency. In step 8034, transaction coordinator $202_{IP}$ verifies transaction coordinator $202_{RP}$'s signature on the request using transaction coordinator $202_{RP}$'s certificate (sent with the request), and the root public key (which may be stored in hardware security module $218_{IP}$). Transaction coordinator $202_{IP}$ then generates a signed OCSP request for the relying participant's transaction coordinator certificate and sends it to root entity 110.

In step 8036, transaction coordinator $202_R$ of root entity 110 stores the raw request in raw transaction log $212_R$. In step 8038, transaction coordinator $202_R$ stores relevant billing data for the request in billing data log $208_R$. In step 8040, transaction coordinator $202_R$ verifies the signature on the request and then sends the request to OCSP responder $204_R$. OCSP responder $204_R$ checks its local repository to determine the status of relying participant's transaction coordinator certificate and sends a response concerning that status back to transaction coordinator $202_R$. Transaction coordinator $202_R$ then sends a signed response back to transaction coordinator $202_{IP}$.

In step 8042, transaction coordinator $202_{IP}$ of issuing participant 102 stores the raw response in raw transaction log $212_{IP}$ for non-repudiation purposes. In step 8044, transaction coordinator $202_{IP}$ then generates an OCSP request from the request it received containing the subscribing customer's certificate, signs it, and sends it to its local OCSP responder $204_{IP}$ along with its own certificate. Alternatively, if the transaction coordinator and OCSP responder are co-located, as signature on the request may not be necessary. Also, if the two are co-located, the transaction coordinator may simply act as a pass through as opposed to re-signing requests or responses.

In step 8046, OCSP responder $204_{IP}$ verifies the signature on the request, generates a response, signs it, and returns the signed response to transaction coordinator $202_{IP}$. In step 8048, transaction coordinator $202_{IP}$ calls risk manager $216_{IP}$ to determine whether or not to issue a warranty for subscribing customer 106. In step 8050, risk manager $216_{IP}$ returns a signed message to transaction coordinator $202_{IP}$ indicating whether a warranty should be issued. In step 8052, transaction coordinator $202_{IP}$ stores the signed response in raw transaction log $212_{IP}$.

In step 8054, transaction coordinator $202_{IP}$ sends a signed request to transaction coordinator $202_R$ of root entity 110 to determine if issuing participant 102 has enough collateral to issue the warranty. In step 8056, transaction coordinator $202_R$ interacts with risk manager $216_R$ to determine if issuing participant 102 is adequately collateralized and, if so, decreases issuing participant 102's collateral level by an amount appropriate for the warranty being issued and returns a response to issuing participant 102.

In step 8058, transaction coordinator $202_{IP}$ verifies transaction coordinator $202_R$'s signature, creates a warranty response, and returns it to transaction coordinator $202_{RP}$ along with its certificate.

In step 8060, transaction coordinator $202_{RP}$ of relying participant 104 stores the raw response in raw transaction log $212_{RP}$ for non-repudiation purposes. In step 862, transaction coordinator $202_{RP}$ verifies transaction coordinator $202_{IP}$'s signature on the response using transaction coordinator $202_{IP}$'s certificate (sent with the response), and the root public key (which may be stored in hardware security module $218_{RP}$). Transaction coordinator $202_{RP}$ then creates a signed OCSP request for the issuing participant's transaction coordinator certificate and sends it to root entity 110.

In step 8064, transaction coordinator $202_R$ of root entity 110 stores the raw request in raw transaction log $212_R$. In step 8066, transaction coordinator $202_R$ stores relevant billing data in billing log $208_R$. In step 8068, transaction coordinator $202_R$ verifies the signature on the request. Transaction coordinator $202_R$ then sends the request to its OCSP responder $204_R$. OCSP responder $204_R$ checks its local repository to determine the status of the subject certificate and sends a response back to transaction coordinator $202_R$. Transaction coordinator $202_R$ then sends a signed response to transaction coordinator $202_{RP}$.

In step 8070, transaction coordinator $202_{RP}$ of relying participant 104 stores the raw response data in raw transaction log $212_{RP}$ for non-repudiation purposes. In step 8072, transaction coordinator $202_{RP}$ checks with transaction coordinator $202_R$ of root entity 110 to ensure that the issuing participant has sufficient collateral to issue the warranty.

In step 8074, transaction coordinator $202_R$ stores the raw request in raw transaction log $212_R$. In step 8076, transaction coordinator $202_R$ stores relevant billing data in billing log $208_R$. In step 8078, transaction coordinator $202_R$ sends a yes or no response to transaction coordinator $202_{RP}$ of relying participant 104 concerning whether issuing participant 102 has sufficient collateral to issue the warranty.

In step 8080, transaction coordinator $202_{RP}$ stores the raw response data in raw transaction log $212_{RP}$ for non-repudiation purposes. In step 8082, transaction coordinator $202_{RP}$ creates a warranty response from the responses received from transaction coordinator $202_{IP}$, signs it, and sends it to relying customer 108 along with transaction coordinator $202_{RP}$'s certificate.

In step 8084, relying customer 108 verifies the response using the root public key stored in hardware security module 230. In step 8086, relying customer 108 sends a request to transaction coordinator $202_{RP}$ for transaction coordinator $202_{RP}$'s certificate to see if it has been revoked.

In step 8088, transaction coordinator $202_{RP}$ verifies the signature on the request and sends a request to its local OCSP responder $204_{RP}$ to ensure that relying customer 108's transaction coordinator certificate has not been revoked. In step 8090, local OCSP responder $204_{RP}$ sends a response to this request to transaction coordinator $202_{RP}$. In step 8092, transaction coordinator $202_{RP}$ sends an OCSP request for its certificate to transaction coordinator $202_R$.

In step 8094, transaction coordinator $202_R$ verifies the signature on the request and checks with its local OCSP responder $204_R$ to determine the status of transaction coordinator $202_{RP}$'s certificate. Transaction coordinator $202_R$ then forwards the response received from local OCSP responder $204_R$ to transaction coordinator $202_{RP}$.

In step 8096, transaction coordinator $202_{RP}$ forwards the response received from transaction coordinator $202_R$ to relying customer 108. In step 8098, relying customer 108 sends an acknowledgment to subscribing customer 106.

In a preferred embodiment, each transaction coordinator 202 provides atomicity, consistency, isolation, and durability to transactions coordinated by the transaction coordinator. Atomicity means that all actions required to complete a transaction succeed or all fail; the transaction is an indivisible unit of work. Consistency means that after a transaction is executed, the system is left in a correct, stable state, or returns to the state preceding initiation of the transaction. Isolation means that each transaction is unaffected by other transactions that may execute concurrently. Durability means that the effects of each transaction are permanent after the transaction is committed. The combination of atomicity, consistency, isolation, and durability are sometimes referred to as ACID properties.

Transaction coordinators 202 preferably provide ACID properties in a distributed computing environment by incorporating a transaction processing monitor or component transaction monitor. Suitable transaction processing monitors may include BEA TUXEDO from BEA Systems, Inc., MSMQ from Microsoft, Top End from NCR Corporation, and Encina from IBM Transarc. Suitable component transaction monitors may include Orbix OTM from Iona Technologies Inc. and BEA WebLogic from BEA Systems, Inc.

Any combination of steps to be coordinated by a transaction coordinator may be combined to form a transaction having the ACID properties. Preferably, one or more pre-defined transactions are provided for each of the process flows depicted in FIGS. 5-7. Thus, for example, the steps occurring between the request and response depicted in FIG. 5 may be combined to form a transaction having ACID properties.

In a preferred embodiment, transaction coordinator components interact with the transaction processing monitor via a transaction processing library. To facilitate a flexible architecture whereby the implemented transaction processing monitor may be replaced with an alternate transaction processing monitor, libraries may be written to access transaction-processing-monitor functionality regardless of the particular brand of transaction processing monitor used.

Each of the above-listed transaction processing monitors has certain features that relate to its suitability for incorporation in a transaction coordinator of the present system. For example, TUXEDO transaction process monitors are designed to provide: (1) a high-performance message-passing engine (2) distributed transaction management, allowing clients and servers to participate in a distributed transaction and to manage two-phase commit processes transparently to applications (3) an application to transaction manager interface allowing developers to write BEA TUXEDO applications regardless of the hardware hosting program (4) dynamic workload balancing that automatically generates and manages parallel copies of applications and ensures that they are evenly utilized (5) transaction queuing that allows distributed applications to work together in an asynchronous, connectionless fashion and that prioritizes queues based on message context, content, and time of day (6) data dependent routing that enables transactions to be processed where the data can be most efficiently utilized (7) automatic recovery from application failures, transaction failures, network failures, and node failures in which the server manager restarts the failed process and recovers the failed program by rolling back the transaction that was in progress.

MSMQ transaction processing monitors from Microsoft are designed to provide: (1) full COM component support (2) access from a range of programming languages (e.g. Visual C++, Visual J++) (3) five APIs (open, close, receive, send, and locate) providing advanced message queuing benefits (4) sliding-window protocols, recoverable storage, dynamic routing to deliver messages, and on-time, in-order message delivery (5) the ability to be included within transactions that contain other activities, such as database updates (6) the ability to commit or abort operations with other resources to preserve data integrity during transactions (7) built-in message encryption, integrity, and signature support and (8) administrators the ability to specify which MSMQ events should create an audit record in the Windows NT Security Log.

MSMQ is typically included as a feature of both MS Windows NT Server, Standard Edition 4.0 and MS Windows NT Server, and Enterprise Edition 4.0. If support for more than twenty-five clients, cost-based routing, or the MSMQ Connector is needed, MSMQ is preferably run on NT Server and Enterprise Edition 4.0. It should be noted that although MSMQ is a high-performance message-passing engine, it does not have necessary features of a transaction process monitor, and therefore may not be suitable for use in the present system.

IBM Encina is available from Transarc on many hardware platforms including Sun, IBM, Digital Equipment Corp., Hewlett Packard, and Windows. IBM Encina transaction processing monitors are designed to provide: (1) interoperability to allow the development of distributed transaction processing applications that integrate a wide variety of systems (2) concurrent use of multiple XA-compliant databases or resource managers, such as Oracle, Ingres, Informix, or Sybase through an X/Open XA application programming interface and provide mainframe LU6.2 interoperability, including sync-level 0, 1, and 2 services, without requiring additional software on the mainframe (3) performance and reliability required by transaction processing applications (4) an efficient, fully-distributed two-phase commit mechanism (5) automatic load balancing and replication of application servers to increase performance and to eliminate single points of failure (6) inherited security mechanisms of the underlying DCE thereby allowing both clients and servers to verify the identities and privileges of participants in a transaction (7) additional security mechanisms, including automated authorization checking and facilities to allow the construction of audit trail records (8) enterprise-wide scalability in order to support large numbers of users and large amounts of data and (9) a centralized administration facility to permit effective management.

Top End transaction processing monitors are designed to provide: (1) robust middleware (2) distributed transaction management (3) client/server interaction (4) reliable file transfer (5) dynamic workload balancing (6) recoverable transaction queuing (7) application parallelization (8) two-phase commit processing (9) automatic recovery (10) message-sensitive routing (11) multiple database support (Microsoft SQL Server, Oracle, and Sybase) and (12) Internet application scalability and availability.

In a preferred embodiment, each transaction coordinator in the present system is adapted to provide a plurality of security services including: authentication, authorization, session security, message security, non-repudiation, and auditing.

In a preferred embodiment, the transaction coordinator uses PKIX authentication based on a PKI defined by root entity 110. Other authentication mechanisms for services outside the present system may be supported as determined by the entity operating the transaction coordinator.

In a preferred embodiment, authentication is provided through the use of digital signatures. Authentication may take place at the session level, the message level, or both.

In a preferred embodiment, the secure socket layer protocol provides session level authentication. The secure sockets layer protocol consists of two phases: server-side authentication and optional client-side authentication. A given transaction coordinator 202 acts as a server when it receives requests from a customer or another transaction coordinator and as a client when it transmits a request to another transaction coordinator.

Figure 9:
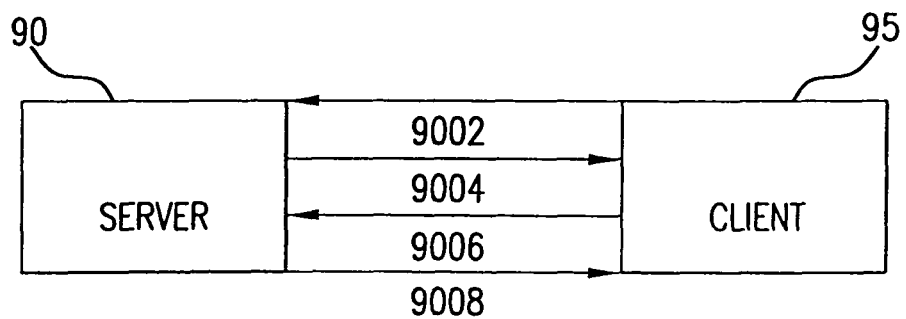
FIG. 9 is a composite block/flow diagram of a preferred embodiment of server-side authentication.

FIG. 9 depicts server-side authentication. A server 90 receives a request from a client 95 (step 9002), and sends its utility certificate to the client (step 9004). In step 9006, client 95 generates a public key, encrypts it with the server's public key and sends it to server 90 (step 9006). In step 9008, server 90 uses its private key to recover the public key sent by client 95, and authenticates itself to client 95 by returning a message authenticated with the public key received from the client. Subsequent data is encrypted and authenticated with keys derived from the client-generated public key.

Secure socket layer server-side authentication allows client 95 to know with whom it is communicating. Server-side authentication is preferably required for all sessions over which network transactions take place. In order to authenticate server 90, client 95 must possess the public key certificate of the root certificate authority in server 90's utility certificate chain.

Figure 10:
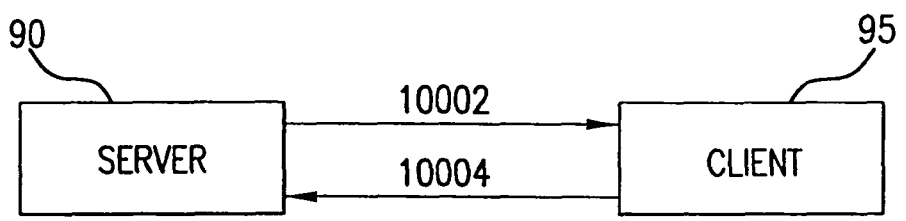
FIG. 10 is a composite block/flow diagram of a preferred embodiment of client-side authentication.

FIG. 10 depicts optional client-side authentication. In step 10002, server 90 sends a challenge to client 95. Client 95 authenticates itself to server 90 by signing the challenge with its private key and returning the signed challenge, with its public key certificate, to the server (step 10004).

Secure socket layer client-side authentication ensures that client 95 possesses a valid utility certificate and the accompanying private key. As noted, in a preferred embodiment, secure socket layer client-side authentication is optional but is employed if relying and issuing participants 104 and 102 do not require digitally signed requests from clients 95. Transaction coordinators $202_{IP}$, $202_{RP}$, and $202_R$ must possess the public key certificate of the root certificate authority in the client's utility certificate chain in order to determine that client 95 holds a valid root certificate.

In a preferred embodiment, at the session level, issuing participant 102 and relying participant 104 authenticate themselves to their customer clients. Issuing participant 102 and relying participant 104 may also require customer clients to authenticate themselves to transaction coordinators $202_{IP}$, $202_{RP}$, and $202_R$ at the time a session is established. Thus, if client 95 is not an authorized customer of the participant with which it is communicating, the transaction coordinator for that participant may terminate the session before processing a message. Participants may also require customer client-side authentication at the session level in lieu of requiring message level authentication.

As noted, authentication between transaction coordinators $202_{IP}$, $202_{RP}$, and $202_R$ may occur either at the session level or at the message level, or both. In contrast, relying customers are preferably required to provide authentication at the message level by digitally signing all requests sent to transaction coordinator $202_{RP}$. However, as previously mentioned, a participant may also require relying customers to provide client-side authentication at the session level.

Figure 11:
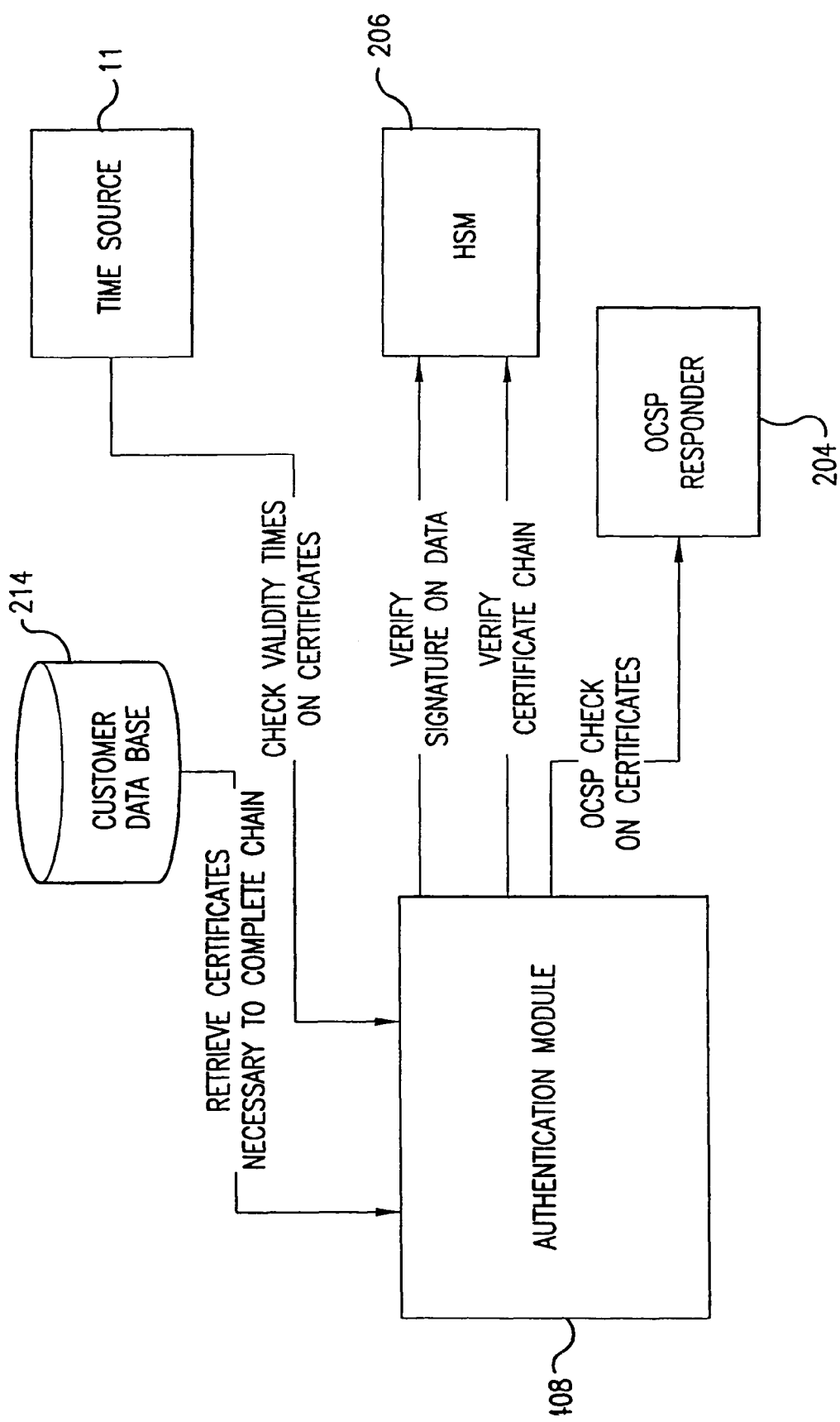
FIG. 11 is a composite block/flow diagram illustrating a preferred message authentication process.

FIG. 11 is a composite block/flow diagram illustrating a preferred message authentication process. As will be described, this process operates to authenticate messages (responses or requests) sent to transaction coordinators 202 by applying a digital signature to data contained in the message.

In step 1102, an authentication module 408 calls hardware security module 218 to verify the signature on a received message using the sender's public key certificate typically sent with the message. In step 1104, authentication module 408 calls hardware security module 206 to check that the sender possesses a valid root warranty certificate by validating the sender's certificate chain, beginning with the root's certificate in the sender's chain. Portions of the sender's chain, such as the sender's public key certificate, are sent with the message. Other portions of the chain may be previously stored in HSM 206 and/or customer database 214, such as the root's certificate.

In step 1106, authentication module 408 calls a time source 11 to obtain the current time and verify that none of the certificates comprising the sender's chain have expired. All participants and root entity 110 are preferably provided with synchronized time sources.

In step 1108, authentication module 408 calls OCSP responder 204 to check that the certificates in the signer's chain, other than those stored in hardware security module 218, have not been revoked.

Message authentication provides a stronger level of authentication than session authentication. Session authentication uses utility keys. In general, OCSP checks are not performed on utility keys, therefore neither a client nor a server will learn during the authentication process if an SSL certificate has been revoked. In addition, utility keys are stored unprotected so that anyone in possession of the token on which the key is stored can masquerade as the authorized user. Warranty keys, on the other hand, which are used to provide message authentication, are protected so that merely possessing the token is not sufficient to gain access to the key and masquerade as the authorized user.

In a preferred embodiment, customer authorization check module 418 (see FIG. 5) checks to make sure the requester of a service is authorized to receive that service. For purposes of determining authorization, the requestor's identity may be determined from session level authentication or message level authentication. Preferably, customer authorization check module 418 performs an authorization check by extracting the user's authenticated identity or distinguished name from its presented utility or warranty certificate, and comparing this against a list of authorized users in customer database 214. In a preferred embodiment, the customer authorization check may be based on a part of the distinguished name, such as any user with a distinguished name subordinate to the financial institution's certificate authority's distinguished name, or it can be based on the entire distinguished name, such that only specific users are authorized.

Customer authorization check module 418 may perform authorization checks at multiple levels. For example, it may have the capability to allow or deny services at the user level, or to allow or deny services based on finer criteria, such as the amount of collateral a user has.

In a preferred embodiment, transaction coordinators 202 provide session security using a secure socket layer (SSL).

SSL typically provide three levels of session security: confidentiality, data integrity, and session authentication. Preferably, all communications to and from transaction coordinators 202 are encrypted using SSL.

Message security in the present system is preferably provided through the use of digital signatures. Digital signatures provide two levels of message security: authentication and data integrity. Digital signatures typically provide authentication through the use of protected private keys, which are used for signing messages.

As noted above, digital signatures preferably provide data integrity through the use of a hash or message digest that is generated during the signature process. Message digests provide a "fingerprint" of the data such that if any bit of the signed data is modified, a different "fingerprint" will result and the recipient of the data will not be able to verify the signature.

In a preferred embodiment, confidentiality is provided at the session level for all root communications. The transaction coordinator preferably complies with confidentiality rules specified by root entity 110.

In a preferred embodiment, each transaction coordinator 202 records all data needed to ensure non-repudiation of a performed service in logs and ensures the integrity of those logs. For example, relying participant 104 preferably provides such non-repudiation for all services it performs for relying customer 108. Thus, for each service performed, transaction coordinator $202_{RP}$ not only provides a response to relying customer 108 but also retains all data necessary to ensure that none of the parties involved in performing the service can repudiate having provided the service.

In a preferred embodiment, digitally signed messages provide the basis for this non-repudiation. As noted, for example, in the context of the validation service described above, transaction coordinators 202 maintain a log of all received messages for non-repudiation purposes. Preferably, transaction coordinators 202 log messages exactly as received and do not parse, modify, or store messages in any format other than the format in which they were received. Modification of received messages renders the message's digital signature unverifiable and thus makes the message unsuitable for non-repudiation purposes.

In a preferred embodiment, each received message is time stamped as part of the non-repudiation service. Responses are associated with authorization checks performed at a certain point in time. Preferably, the time of the authorization check is a signed attribute in the response and is captured in raw transaction log 212.

In a preferred embodiment, transaction coordinator 202 also logs information for auditing purposes. Security audit logs may be used to detect potential attacks against the system, such as a suspicious number of requests from non-customers or a suspicious number of invalid signatures. Security audit logs may also assist when a key compromise occurs because a key may be compromised before it is reported and its associated certificate is revoked. The security audit logs may preferably be used to determine if transactions occurred using a compromised key.

An audit trail is maintained for purposes of dispute resolution, non-repudiation, and billings. In a preferred embodiment, a transaction coordinator logs every message that it sends or receives and logs the entire message. Messages may be logged in "raw" format. Alternatively, the transaction coordinator may break the message into its constituent parts and store it in a schema such that the entire message can be reconstructed in a manner that preserves the signature. In a preferred embodiment, logs are of such a nature that log entries cannot be falsified (added/deleted/altered) without being detected. In addition, if a transaction coordinator logs a message in raw format, it preferably includes the capability to convert the raw data into a format readable by a COTS solution. This may be a loosely coupled utility or a part of the transaction coordinator functionality that runs as a separate and perhaps lower priority/background process. It may also run on an entirely separate system. The logs may contain other data related to the transport and the session. As an example this may include, sender/recipient IP address, the URL of the post, SMTP header etc.

Transport services component 306 (shown in FIG. 3) preferably comprises a secure communications component that establishes a secure socket layer session between transaction coordinator 202 and the entity with which it is communicating. In a preferred embodiment, the secure communication component performs session authentication, as described above. Thus, when transaction coordinator 202 acts as a server 90, the secure communications component provides server-side session authentication and may request client-side session authentication. In contrast, when transaction coordinator 202 acts as a client 95, the secure communications component is responsible for authenticating server 90.

As a client, transaction coordinator 202 is also preferably responsible for establishing session security by generating a session key and sending the key, which is encrypted with the server's public key, to the transaction coordinator server with which it wants to communicate. Subsequent communications between the two parties are encrypted with that session key.

Figure 12:
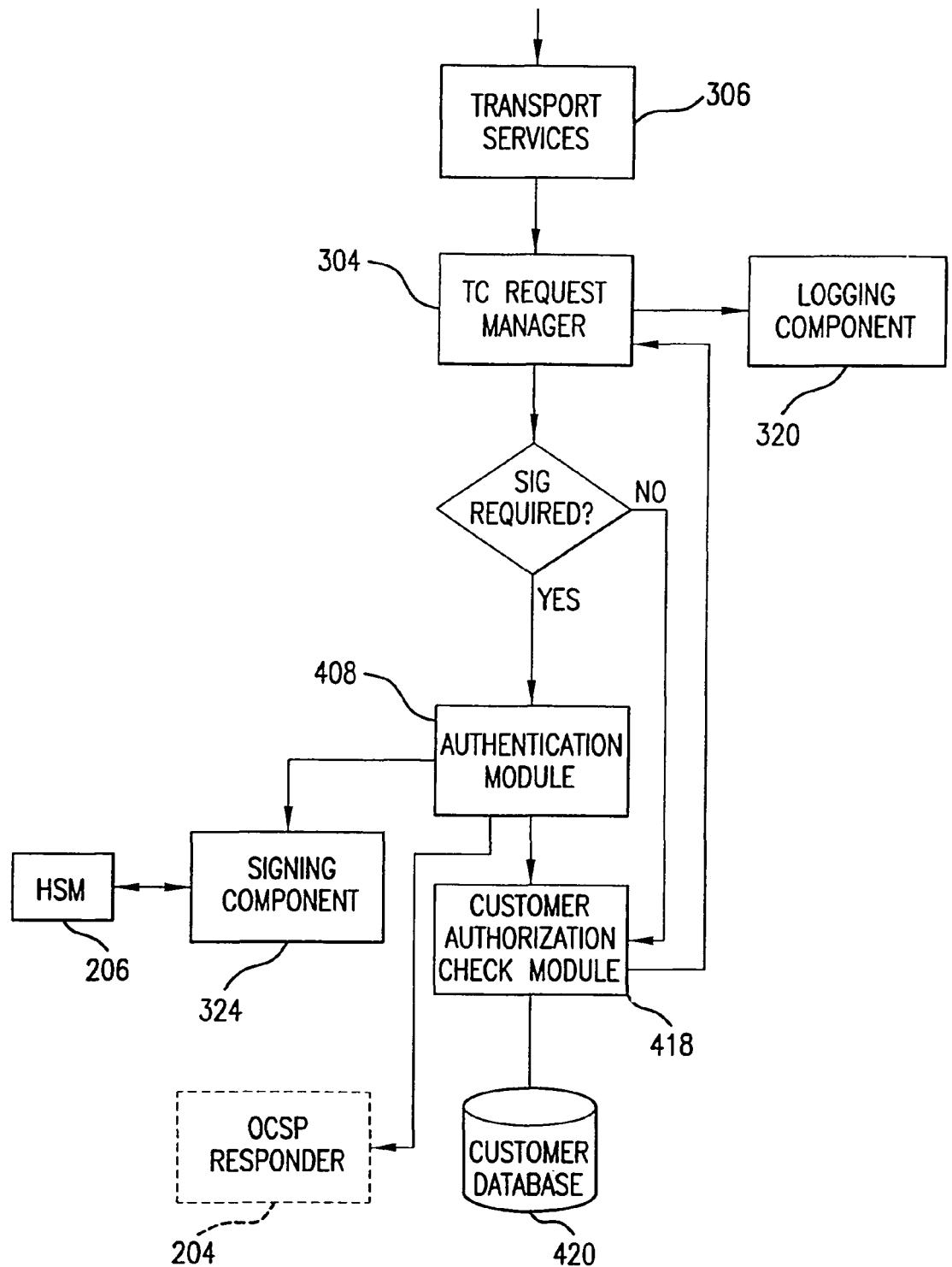
FIG. 12 is a composite block/flow diagram of a preferred embodiment of the security-relevant flows associated with components of a transaction coordinator.

FIG. 12 is a composite block/flow diagram that depicts a preferred embodiment of the security-relevant flows associated with components of transaction coordinators 202. As shown in FIG. 12, in step 1202, a request is received by transport services component 306. In step 1204, transport services component 306 delivers the request to request manager 304. Preferably, request manager 304 ensures that all security-related functions are performed on incoming messages before the messages are processed.

In step 1206, request manager calls logging component 320 to log the raw request data. Logging component 320 gathers the data required to support non-repudiation and auditing. As noted above, all requests and responses are preferably logged as received.

In step 1208, request manager 304 determines if a signature on the request is required. In step 1210, if request manager 304 determines that the request does not need to be signed, request manager 304 calls customer authorization check module 54 with the client's utility certificate.

In step 1212, if request manager 304 determines that a signature is required, request manager 304 calls customer authentication module 408. In step 1214, customer authentication module 408 verifies the signature on the request and validates the certificate chain by calling signing component 324.

Preferably, signing component 324 provides message security and supports the session and message authentication services. Signing component 324 interfaces with hardware security module 218, which performs all cryptographic functions. Root 110 preferably specifies the digital signature method that will be used to sign all transactions. Signing component 324 preferably interfaces with hardware security module 218 to perform all cryptographic functions involved in the signature verification process.

In step 1216, customer authentication module 408 checks the status of the customer's warranty certificate by sending a request to OCSP responder 204 via certificate status check component 414, as described above.

In step 1218, customer authentication module 110 calls customer authorization check module 418 with the customer's warranty certificate. In step 1220, customer authorization check module 418 checks customer database 214 to make sure the request came from a customer authorized to obtain the requested service. In step 1222, a response regarding authorization is returned to request manager 304 and processing of system provided services continues as described above.

Preferred security requirements for network communications between transaction coordinators and the following entities: customers, OCSP responders, and other transaction coordinators will now be described. These preferred requirements are described in the context of an example in which relying customer 108 submits a request to relying participant 104.

When transaction coordinator $202_{RP}$ of relying participant 104 receives a request from a relying customer 108, transaction coordinator $202_{RP}$ authenticates the request. Signatures are typically required on all messages sent to transaction coordinator $202_{RP}$ by relying customer 108. In addition, transaction coordinator $202_{RP}$ may require relying customer 108 to provide secure socket layer client-side session authentication.

Preferably, transaction coordinator $202_{RP}$ provides authentication of all messages it sends to relying customer 108. In addition, transaction coordinator $202_{RP}$ provides secure socket layer server-side session authentication when any session is established with relying customer 108.

In a preferred embodiment, transaction coordinator $202_{RP}$ performs authorization checks to determine if relying customer 108 is an existing customer of relying participant 104. Transaction coordinator $202_{RP}$ may also perform authorization checks to determine if relying customer 108 is authorized to receive the type or level of service being requested. Preferably, relying customer 108 has an entry in customer database $214_{RP}$ that lists the services to which it is entitled. Preferably, relying customer 108 is identified by a distinguished name as it exists in its warranty certificate and may also be identified by its distinguished name as it exists in its utility certificate if secure socket layer client-side session authentication is employed. This aspect of the transaction coordinator may be integrated with COTS access control/authorization packages.

In a preferred embodiment, transmissions between relying customer 108 and transaction coordinator $202_{RP}$ are encrypted in accordance with specifications specified by root entity 100 and server-side authentication is required.

Typically, messages exchanged between relying customer 108 and transaction coordinator $202_{RP}$ are digitally signed. Preferably, transaction coordinator $202_{RP}$ verifies all signed messages received, validates the certificate chain, and ensures that the certificates within the chain have not been revoked. In addition, transaction coordinator $202_{RP}$ signs all messages it sends to relying customer 108.

In a preferred embodiment, transaction coordinator $202_{RP}$ provides a non-repudiation service for relying customer 108. Transaction coordinator $202_{RP}$ typically logs all responses relating to requests for service received from any root component. This includes other components of transaction coordinator $202_{RP}$ as well as components of other participants and root 110. Preferably, relying participant 104 logs all requests for services from relying customer 108 and all acknowledgments received from relying customer 108 indicating the receipt of a response in order to protect itself from repudiation claims from its customers.

In a preferred embodiment, transaction coordinator $202_{RP}$ logs all requests for services from relying customer 108 for auditing purposes. Accordingly, a system administrator can detect potential attacks against the system and determine if requests for services were received after a key compromise occurred. Auditing of requests may also be used to support any billing disputes that may arise.

In a preferred embodiment, transaction coordinators $202_{IP}$, $202_{RP}$, and $202_R$ communicate respectively with OCSP responders $204_{IP}$, $204_{RP}$, and $204_R$ only, i.e., OCSP responders that are within their financial institution. To request a response from an OCSP responder 204 at another financial institution, communications must preferably go through the other financial institution's transaction coordinator 202.

Preferably, OCSP responders $204_{IP}$, $204_{RP}$, and $204_R$ know the identity of the entity from which they are receiving a request and transaction coordinators $202_{IP}$, $202_{RP}$, and $202_R$ know the identity of the entity from which they are receiving an OCSP response. Preferably, co-located transaction coordinators $202_{IP}$, $202_{RP}$, and $202_R$ and OCSP responders $204_{IP}$, $204_{RP}$, and $204_R$ know that they are receiving messages from a local process without any explicit authentication. In this case, neither secure socket layer authentication nor signed requests are required. However, OCSP responders $204_{IP}$, $204_{RP}$, and $204_R$ may typically sign all responses and transaction coordinators $202_{IP}$, $202_{RP}$, and $202_R$ may typically accept signed responses in accordance with the Internet PKI OCSP specification.

If transaction coordinators $202_{IP}$, $202_{RP}$, and $202_R$ and OCSP responders $204_{IP}$, $204_{RP}$, and $204_R$ are not co-located and cannot ascertain unambiguously with whom they are communicating, authentication between the components is preferably required. Authentication of requests may be either at the session level or the message level. Authentication of responses is preferably at the message level and may be at the session level, as well.

It should be recognized that transaction coordinators $202_{IP}$, $202_{RP}$, and $202_R$ do not typically perform authorization checks on OCSP responders $204_{IP}$, $204_{RP}$, and $204_R$ since OCSP responders $204_{IP}$, $204_{RP}$, and $204_R$ do not typically request services from transaction coordinators $202_{IP}$, $202_{RP}$, and $202_R$.

Because OCSP responders 204 are preferably co-located with their respective transaction coordinators 202, transmission security mechanisms do not typically have to be provided for communications between them. Because the two components are contained within a physical environment that is completely under the control of one financial institution, protection can preferably be provided through policy as opposed to implementation of security mechanisms.

However, if these components are not co-located, the transmissions are preferably protected against network attacks that could compromise the confidentiality or the integrity of the transmissions. Preferably, SSL is used to provide this protection.

In a preferred embodiment, each OCSP responder 204 is co-located with its respective transaction coordinator 202 and transaction coordinator 202 therefore need not sign OCSP requests. However, OCSP responder 204 may sign responses if required by specifications specified by root entity 110.

In cases where OCSP responses are signed, they are preferably logged with the signature of the responder intact, in particular when the response is directly related to the service being provided. However, if transaction coordinator 202 has requested an OCSP response as part of an authentication check on a request for service, the OCSP response is typically not logged for non-repudiation purposes. This is because the OCSP check is performed to determine whether or not to process the incoming request, not as part of processing the request itself. Only information relating to the processing of the request is necessary to retain for non-repudiation purposes. In a preferred embodiment, local OCSP responses are typically only logged when relying participant 104 is also issuing participant 102 of the certificate in question and the OCSP request is part of the process for providing a service, e.g., checking the subscribing customer's certificate during a validation request for that certificate.

In a preferred embodiment, there are no requirements to log OCSP responses for security auditing purposes because OCSP responders 204 do not request services of transaction coordinators 202. In addition, there are no requirements to log OCSP requests generated by transaction coordinators 202 for security auditing purposes because transaction coordinator 202 cannot audit itself.

Preferably, transaction coordinators authenticate all requests from other transaction coordinators. This is typically accomplished either by secure socket layer client-side authentication or by a financial institution configuring its transaction coordinator to require signatures on all requests from other transaction coordinators.

In a preferred embodiment, a first transaction coordinator that receives a request from a second transaction coordinator performs an authorization check to determine if the requesting transaction coordinator is authorized to make the request. This authorization check is facilitated by providing all authorized transaction coordinators $202_{IP}$, $202_{RP}$, and $202_R$ with an entry in the customer database of the transaction coordinator from which they desire to obtain service. If transaction coordinator 202 from whom services are being requested requires a signature, the requestor may preferably be identified by its distinguished name as it exists in its warranty certificate. If not, identification from its utility certificate should preferably be permitted only if secure socket layer client-side authentication is required.

Preferably, transmissions between relying customer 108 and transaction coordinator $202_{RP}$ are encrypted and server-side session authentication is required.

A participant may require that all requests sent to its transaction coordinator from other transaction coordinators be signed. In lieu of this, a participant may require secure socket layer client-side session authentication. Preferably, transaction coordinators $202_{IP}$, $202_{RP}$, and $202_R$ sign all responses being sent to other transaction coordinators.

Preferably, transaction coordinators $202_{IP}$, $202_{RP}$, and $202_R$ provide a non-repudiation service. To this end, transaction coordinators $202_{IP}$, $202_{RP}$, and $202_R$ log all responses relating to a request for service received from other transaction coordinators.

Preferably, all requests for services received by transaction coordinators $202_{IP}$, $202_{RP}$, and $202_R$ will be logged for auditing purposes. This enables a system administrator to detect potential attacks against the system and also enables the system administrator to determine if requests for services were received after a key compromise occurred. Auditing of requests may also be used to support any billing disputes that may arise.

Preferred architectural components of a transaction coordinator are now discussed in greater detail.

Components of a transaction coordinator are preferably implemented as customized software code although other software products may be used as described herein. In addition to this code, a participant may write and implement its own additional service modules. Thus, participants may implement their own business specific rules for the certificate status check service described above and other services that may be offered via the four-corner model.

In a preferred embodiment, a customer software development kit is used as a tool-set to facilitate the interface between transaction coordinator 202 and customers or other transaction coordinators. The software development kit is preferably integrated with transport services component 306. The software development kit is preferably adapted to intercept all hyper-text transfer protocol requests destined for an application's original web server at a web site maintained by relying customer 108. The software development kit preferably determines whether the message needs to be signed based on a defined set of rules. The customer software development kit also authenticates signatures and public key certificates with the help of hardware security module 230. A preferred embodiment of one such SDK is described in copending U.S. patent application Ser. No. 09/657,604, filed Sep. 8, 2000, entitled System and Method for Facilitating Access By Sellers to Certificate-Related and Other Services, which is hereby incorporated by reference.

Depending upon the breadth of the features provided by the software development kit, its usage may preferably be expanded to other areas of transaction coordinator operation. Certain modifications and additional functionality are typically required in order for the software development kit to be used within the transaction coordinator.

A Microsoft™ SQL server may preferably be used as the database for storing billing data. Preferably, transaction coordinator 202 is adapted to interact with the server via a database library. Alternatively, interaction with the server may be done using JAVA™ Database Connectivity if the transaction coordinator development is done in JAVA™. In addition, database libraries may be written for other servers thereby permitting the replacement of a Microsoft SQL server by another database without impacting transaction coordinator 202.

Preferably, Microsoft's MS SQL Server provides the following features and functionality: (1) Online Analytical Processing (OLAP) Services to efficiently analyze complex information essential to reporting, data analysis, decision support, and data modeling (2) on-disk storage architecture (3) a Multiphase Query Optimizer (4) auto statistics to enable the query optimizer to use the latest information and to increase query efficiency (5) active backup to provide high performance online backup with minimal impact on operational systems (6) merge replication to allow users to work independently, then combine their work later (7) built-in priority-based conflict resolution to resolve merge conflicts (8) ability to publish data on the Web (9) a data transformation service to simplify the process of importing and transforming data from multiple, heterogeneous sources (10) ability to check physical and logical database consistency (11) dynamic row-level locking (17) a query optimizer that manages statistics gathering and guaranteeing an efficient plan (13) an intra-query parallel execution of a single query across multiple processors to improve performance; steps in a single query are executed in parallel thereby delivering an optimum response time (14) a redesigned query processor to better support the large databases and complex queries found in decision support, data warehousing, and Online Analytical Processing applications (15) sort speed (16) multiple triggers per table and direct recursion of triggers (17) dynamic memory to optimize memory allocation and usage and dynamic memory management (18) parallel backup and the ability to restore utilities scale at device speeds (19) smart read-ahead logic to improve performance and to eliminate the need for manual tuning and (20) run-time checks of critical structures.

Preferably, adequate data is captured and stored to allow the entity that maintains a transaction coordinator to generate billing invoices on a per transaction basis. To this end, in a preferred embodiment, each and every incoming and outgoing message generated by a transaction coordinator, in its entirety, is stored in successive records in a database. Such messages include: all requests received, all requests made, all responses generated, and all responses received. This ensures availability of all the necessary data to generate invoices on a per transaction basis.

Preferably, transaction coordinator 202 records billing data in a centralized general fashion. Participants may obtain records by writing their own routines to extract the billing data relevant to the participant from the centralized billing data. In addition to providing data in the database, data may also be provided in EXCEL™ spreadsheets.

In a preferred embodiment, TymeServe Network Time Server ("TYMSYNC")™ by Datum Inc. is used as the transaction coordinator's time stamping component. TYMSYNC is a time synchronization package that acquires time from the Global Positioning System Navstar satellite constellation with absolute accuracy to the nearest microsecond relative to the Universal Time Coordinator as maintained by the U.S. Naval Observatory. This product may be adapted to synchronize workstations in TCP/IP (transmission control protocol over internet protocol) and LAN (local area network) networks. Preferably, time is distributed within the network using the Network Time Protocol. TYMSYNC may be configured to continuously synchronize a computer system's clock to the Universal Time Coordinator. The times when requests and responses are generated and when messages are received and sent are preferably stored for non-repudiation and auditing purposes.

In a preferred embodiment, all communications with transaction coordinator 202 are conducted over secure connections. Preferably, the secure socket layer encryption scheme for synchronous communications is used. Secure socket layers are used in a fashion compatible with commercial/web server implementations and provide security and privacy over electronic networks such as the Internet. Secure socket layers are application independent, thereby allowing protocols to be layered transparently on top of them.

Secure socket layers provide confidentiality, data integrity, and authentication for all network communications. Secure socket layers typically ensure confidentiality by encrypting all data being passed between the communicating entities. When a secure socket layer-enabled client 95 and server 90 first communicate, they agree on a protocol version and select encryption algorithms. Preferably, network endorsed encryption algorithms and key lengths are specified by root entity 110.

Secure socket layers also typically ensure data integrity through the use of encryption. If a message does not decrypt correctly, the recipient can tell that someone has tampered with the message.

Secure sockets layers also support server and client authentication, negotiate encryption keys, and authenticate the server before data is exchanged by the higher-level application. Authentication is preferably provided through the use of digital signatures and public key certificates, which are exchanged at the time an electronic communication session is first established.

In a preferred embodiment, each transaction coordinator is capable of accepting and sending messages over the public Internet using SMTP to send S/MIME messages and communicating via the HTTP protocol over an SSLv3 connection (HTTPS). In other words, each transaction coordinator is preferably adapted to support the following two modes of communication:

HTTP over Secure Sockets Layer (SSLv3)—For synchronous communications (i.e. HTTPS). HTTPS is a hypertext transfer protocol that incorporates secure sockets layer between Web servers and Web browsers in order to transfer Web pages securely. Use of HTTP keep alive is recommended.

S/MIME v2—For asynchronous communication using SMTP.

In a preferred embodiment, each transaction coordinator acts as an HTTPS server during communications with the relying customer and as an HTTPS client when it makes a request to a transaction coordinator at another financial institution. In either mode, all SSL communication for credential status checking may employ only server authentication.

In a preferred embodiment, each transaction coordinator may accept messages delivered via other transport protocols (e.g., IIOP) approved by root entity 110. In addition, participants may implement other transport protocols locally by arrangement. In the absence of prior agreement, however, only HTTPS support should be assumed.

In a preferred embodiment, Valicert's™ OCSP responder is used for certificate status check service 312. However, access to OCSP responder 204 may be achieved using libraries. Thus, by writing new libraries, new OCSP responder vendors may be implemented.

Preferably, OCSP responder 204 determines certificate status without using a certificate revocation list. OCSP responder 204 may move most of the processing involved to a certificate authority, a component that issues, verifies, and revokes certificates, and eliminate the need to download potentially large certificate revocation lists. Alternatively, these functionalities may be divided among different components which may be provided with separate signing keys. For example, the function of issuing certificates may be separated from the revocation function, and components for performing these functions may be provided with separate signing keys.

In a preferred embodiment, a hardware security module is used as a signing component. The hardware security module is preferably a high-speed device for signing and verifying signatures. The hardware security module is typically a networked hardware device that provides cryptographic services to authenticated entities. A suitable hardware security module is manufactured by NCipher.

In a preferred embodiment, transaction coordinator 202 is always available to process requests during its normal operating times, which may be twenty-four hours a day seven days a week. To make sure the system meets availability requirements, a detailed requirement analysis of system-availability should be conducted. Because different participants may have different requirements, many different types of failures may occur. As is known, many different hardware and software vendors offer different options for high-availability systems. However, these options may or may not be available for the hardware and software that is chosen by a given financial institution.

There are a number of known potential hardware failures that may affect a transaction coordinator. For example, the power supply to the server may fail. Preferably, a multiple redundant hot-swap power supply automatically swaps to a redundant power supply. If the server fails or crashes, the transaction coordinator preferably provides for high availability clustering for automatic fail over. In addition, the transaction coordinator preferably comprises a self re-start capability for automatically rebooting the server in the event of a network operating system (NOS) hang.

The transaction coordinator also preferably comprises multiple redundant hot-swap disk drives and a disk array controller to handle disk failure or crashes. The transaction coordinator also comprises a network interface to provide support for redundant network interface cards (NICs) in the event of NIC failure. In the event of cooling system failure, the transaction coordinator preferably uses redundant hot-swap cooling systems comprising hot swappable redundant fans which are individually removable. The transaction coordinator also preferably comprises an Intelligent Platform Management Interface to detect hardware and software failures. The Intelligent Platform Management Interface is an open specification which simplifies and standardizes communications for device management. In the event of memory corruption, the transaction preferably uses self-correcting memory. The self-correcting memory is preferably a managed error checking and correcting system memory and cache memory.

In the event of application crashes, transaction coordinator 202 preferably uses transaction processing monitoring to restart the application. The transaction coordinator may also run redundant copies of an application and the transaction process monitor may transfer transactions to the redundant copies. Certain application availability features may require that the application to be coded in a specific way which may also help address application crashes.

In the event of an operating system crash, transactions are preferably transferred to a standby machine that is supported by the network. Directory services, including middleware like CORBA, may also be used to re-direct any new transaction requests to the new machine.

In addition to the hardware and the software availability products, a monitoring infrastructure is preferably used to monitor the applications and the network.

In a preferred embodiment, a software monitoring tool (such as Trivoli) is used to monitor applications. This tool is preferably configured to page the administrator in the event of application failure. A network monitoring system (such as that made by NetView) may also be used to allow administrators to monitor the network.

Preferably, custom written application daemons are used to simulate transactions. If these transactions fail, system administrators may be informed. Also, database vendor tools may be used for database monitoring. Most databases provide database-monitoring tools that detect deadlocks and other databases problems.

A distribution approach for the transaction coordinator may preferably be defined that is a function of what root entity 110 wishes to distribute to participants. Application distribution may typically be performed via Web-download from root entity 110. The Web-download mechanism may provide for selective download, authentication, and tracking.

In a preferred embodiment, the transaction coordinator may be adapted to support integration with existing operational systems such as CICS, IMS and other legacy systems.

Participants may choose to use the entire transaction coordinator architecture and functionality described above, or may instead choose to use components of the transaction coordinator and add their own implementations to those components. The Web-download approach is preferably configured to fulfill the varying requirements of participants. The download mechanism preferably provides at least three download options: (1) a download transaction coordinator executable option (2) a source code or binaries of the transaction coordinator option and (3) a source code of transaction coordinator classes option.

The first option preferably accommodates participants that choose to use the transaction coordinator in its entirety. This option provides options for different platforms. The second option preferably accommodates participants that choose to plug components of the transaction coordinator described above into their own implementations. This download mechanism also provides options for different platforms. The third option preferably accommodates financial institutions that opt for heavy-duty development and choose only to use certain pieces of implementation of the transaction coordinator described above.

Preferably, the download mechanism allows financial institutions to not only download the executable, but also the source code. Because the downloaded executable may be used on its own and the source code may be used to develop other custom applications, root entity 110 preferably provides download access only to those institutions that are trusted partners with root entity 110 and hence are authorized to use the transaction coordinator. Preferably, this is achieved via an authentication/authorization process.

Root entity 110 may preferably track which participants download particular components of the transaction coordinator. This way root entity 110 may determine the versions of the transaction coordinator and/or its components that are being used at any given time. Root entity 110 may use this information to (1) charge a fee from the financial institutions for the downloaded component(s) and to (2) track versions of the transaction coordinator for maintenance purposes.

Preferably, the transaction coordinator is adapted to be scalable to accommodate a growing user base without significant performance degradation. One step in fulfilling the scalability requirements for an application is to forecast the potential growth in the user base. In general, an application with a distributed architecture facilitates higher scalability by allowing distributed multiple instances of heavily loaded components to be running at a given time. The transaction coordinator architecture is preferably a distributed one and, therefore, supports scalability. In addition, the load-capacity of the transaction coordinator is preferably base-lined on a chosen development machine. This information is used to select appropriate hardware to support the anticipated number of transactions. Preferably, the transaction coordinator (and OCSP responder) are adapted to reliably handle up to 1000 validation transactions per minute.

As noted above, OCSP checks are typically not performed on utility certificates. If signatures are not required on requests, there is no mechanism in place to ensure that the secure socket layer client-side certificates have not been revoked. Preferably, if a secure socket layer certificate has been revoked, financial institutions are informed out of band (e.g., a broadcast message) and the affected users are removed from the participant's customer database.

Each transaction coordinator typically trusts some set of certificates that are stored on its hardware security module. No OCSP checks are performed on these certificates. If a revoked certificate exists on a hardware security module, it will not be detected during on-line processing. Preferably, financial institutions are notified if a certificate stored on a hardware security module has been revoked so that they can remove the certificate from the hardware security module.

Transaction coordinators, when acting as clients, authenticate servers with whom they are communicating. But this check typically only guarantees that the server has a certificate that was issued by a certificate authority that the transaction coordinator trusts. There are no checks regarding the identity or status of the server itself. In a preferred embodiment, the transaction coordinator checks servers against a list of trusted servers and performs OCSP checks of the server's certificate. However, since there is little to be gained by a server intercepting requests, the degradation of performance resulting from these additional checks is typically not warranted.

Typically, the transaction coordinator does not have automated processes for detecting potential attacks. Preferably, system and security administrators inspect audit logs periodically in order to identify such potential attacks.

Typically, requests that do not pass a secure socket layer client-side authentication check are not logged. If an attack (e.g., a denial of service attack) occurs at this level, there are no logs to reference.

In a preferred embodiment, the transaction coordinator is protected by a firewall. Preferably, the firewall component maintains logs of incoming requests.

The transaction coordinator is preferably provided with automated intrusion detection mechanisms. These processes typically watch incoming traffic or scan audit logs looking for suspicious activity, and take appropriate actions if necessary.

The transaction coordinator preferably maintains logs for non-repudiation purposes. Often, however, the system will not include functions to assist a user in retrieving the data necessary to support non-repudiation. The user manually searches through the logs to find all the supporting data. In other embodiments, automated non-repudiation tools may be used to assist the user in this process.

In a preferred embodiment, transaction coordinators and OCSP responders employ normal Internet time out values for certificate status check requests. For other services, the time out value may be set as appropriate for the service. In a preferred embodiment, timeout values are configurable in the transaction coordinator.

The following discussion outlines a possible hardware and software implementation for a transaction coordinator.

The main server used for the transaction coordinator may be a Hewlett Packard Netserver LH4. Preferably, the server has the following specifications: 4 P2-450 MHZ processors, 512-768 MB RAM, 40-60 GB HD with Raid 5 Array, UPS, and an external DLT 40E DLT 4000 tape drive for tape backup. Preferably, at least five workstations are used each having the following specifications: P2400 MHz processors, 128 MB RAM, and 6 GB HD.

The transaction coordinator is preferably platform independent so that it can be supported on servers based on Microsoft Windows NT 4.0/2000, Sun Solaris, and Hewlett Packard HP-UX. Implementation is preferably done in JAVA however some coding may be done in C/C++ as well.

A Windows NT Server w/Service Pack 3 may be used as the operating system. Microsoft Visual SourceSafe 6.0 may be used for source control. Visual Café Professional Edition 3.0 from Symantec (Java Version 1.2) may be used for development. SSL/J SDK from RSA Security Systems may be used for secure socket layer implementation and is also required by XETI's JKIX.

For signature verification, nCipher's hardware security module may be used. For signatures from subscribing customers, Datakey smart cards may be used. Preferably, OCSP responders are provided with a toolkit that provides an interface to cryptographic functions and for ASN.1 Communication. In a preferred embodiment, XETI's JKIX may be used for this purpose.

For digital time stamping, Datum's TYMSYNC or other trusted time source may be used. An MS SQL Server may be used for the databases described above. Code Warrier from Metro Works may be used for the development of portable C/C++ development. CodeIntegrity may be used to perform code integrity checks to verify code portability.

Typically, the size of the data that is passed between different entities is instrumental in the performance of a public key infrastructure system. Messages submitted between entities are therefore preferably analyzed to estimate the size of the data that is transmitted. The analysis may be done on the basis of the certificate fields defined in RFC2459 along with specific root extensions.

The exact data lengths of the certificate fields, which have a fixed length, are preferably taken into account during the estimation. However, there are many fields for which the length varies. For these fields, a liberal estimate on the size is preferably made (i.e., larger rather than smaller). Also, estimates of overall message size preferably include the sizes for all extensions, i.e., if a message allows five different extensions, the size is preferably calculated on an assumption that all five extensions are being sent with the request.

Figure 13:
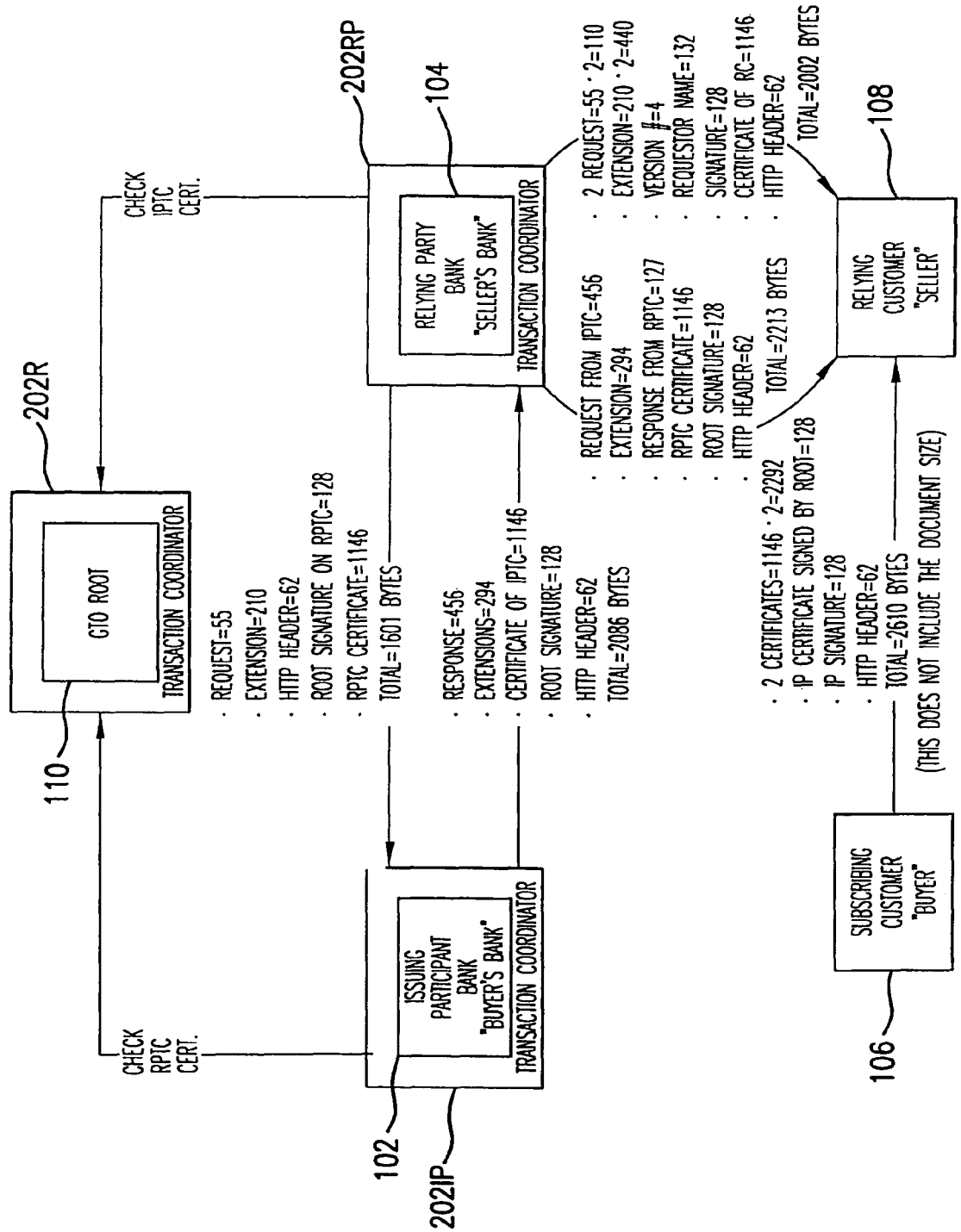
FIG. 13 is a composite block/flow diagram that depicts the (estimated) sizes of messages that are passed between system entities in a preferred embodiment.

FIG. 13 depicts the different message (estimated) sizes passed between system entities in a preferred embodiment. As shown in FIG. 13, the total estimated message size of messages passed from subscribing customer 106 to relying customer 108 is 2610 bytes. The message typically comprises two certificates, each 1146 bytes, the issuing participant's certificate signed by root entity 110, 128 bytes, the issuing participant's signature, 128 bytes, and an HTTP header, 62 bytes.

The total estimated message size of messages passed from relying customer 108 to relying participant 104 is 2022 bytes. The message typically comprises two requests, one concerning the subscribing customer's certificate and one concerning the issuing participant's certificate, each 55 bytes, a message extension, 210 bytes, a version number, 4 bytes, the relying participant's name, 132 bytes, the relying participant's signature, 128 bytes, the relying customer's certificate, 1146 bytes, and an HTTP header, 62 bytes.

The total estimated message size of messages passed from relying participant 104 to issuing participant 102 is 1601 bytes. The message typically comprises a request concerning the subscribing customer's certificate or the issuing participant's certificate, 55 bytes, a message extension, 210 bytes, the root entity's signature on the relying participant's transaction coordinator certificate, 128 bytes, the relying participant's transaction coordinator certificate, 1146 bytes, and an HTTP header, 62 bytes.

The total estimated message size of messages passed from issuing participant 102 to relying participant 104 is 2086 bytes. The message typically comprises a response concerning either the subscribing customer's certificate or the issuing participant's certificate, 456 bytes, a message extension, 294 bytes, the issuing participant's certificate, 1146 bytes, the root entity's signature, 128 bytes, and an HTTP header, 62 bytes.

The total estimated message size of messages passed from relying participant 104 to relying customer 108 is 2213 bytes. The message typically comprises a response concerning the subscribing customer's certificate or the issuing participant's certificate, 55 bytes, a message extension, 210 bytes, the response from the relying participant's transaction coordinator, 127 bytes, the relying participant's transaction coordinator certificate, 1146 bytes, the root entity's signature on the relying participant transaction coordinator's certificate, 128 bytes, and an HTTP header 62 bytes.

The detail on message size estimation of different fields is depicted in the table below. Typically, the size of message being passed between the entities is between 2K and 3K. Once the transaction volume has been projected, this information is preferably used to estimate the network load.

| Certificate Size - No Extensions or Root Specific instructions ||||
|---|---|---|---|
| Certificate { | | Size (in Bytes) | Size Calculation Comments |
| TbsCertificate { | | | |
|     Version | Integer | 4 | |
|     Serial Number Integer | | 4 | |
|     signature { | | | |
|     Algorithm | Object Identifier | 11 | |
|     Parameters | Defined by Algorithm | 32 | Signature algorithm parameters are usually NULL but since parameters are allowed, 32 bytes have been assigned for it |
|     } | | | |
|     issuer | Name | 132 | This is a higher estimate - approximated for 4 names. Name is defined as sequence of Relative Distinguished Name |
|     validity { | | | |
|       notBefore { | | | |
|         utcTime | UTCTime | 32 | |
|         generalTime | GeneralizedTime | 32 | |
|       } | | | |
|       notAfter { | | | |
|         utcTime    UTCTime | | 32 | |
|         generalTime | GeneralizedTime | 32 | |
|       } | | | |
|     } | | | |
|     subject | Name | 132 | This is a higher estimate - approximated for 4 names. Name is defined sequence of Relative Distinguished Names |
|     subjectPublicKeyInfo  { | | | |
|     algorithm { | | | |
|       Algorithm | Object Identifier | 11 | |
|       Parameters | Defined by algorithm | 32 | Signature algorithm parameters are usually NULL but since parameters are allowed, 32 bytes have been assigned for it |
|     } | | | |
|     subjectPublicKey | BIT STRING | 128 | |
| } | | | |
|     issuerUniqueID | BIT STRING | 132 | This is higher estimate. Usually if Issuer is defined, issuerUniqueID should not be used |
|     subjectUniqueID | BIT STRING | 132 | This is higher estimate. Usually if Subject is defined, subjectUniqueID should not be used |
|     extensions { | | | |
|       extnID | Object Identifier | 0 | Certificate is being estimated without any extensions. extnID would take 11 bytes. |
|       critical | BOOLEAN | 0 | BOOLEAN would take 4 bytes |
|       extnValue | OCTET STRING | 0 | Will depend upon the extension |
|     } | | | |
| } | | | |
| signatureAlgorithm { | | | |
|     algorithm | Object Identifier | 11 | |
|     parameters | Defined by Algorithm | 32 | |
| } | | | |
| Signature Value | BIT STRING | 128 | This may vary from signer to signer. When signed by root, the size will be 256 when signed by the root |
| } | | | |
| Total | | 985 | |

| Certificate Extension - with Root Instructions and Extensions |||
|---|---|---|
| Certificate Extension/root entity Specific Instructions | Size (in Bytes) | Size Calculation Comments |
| Must not contain Issuer Unique ID | −132 | |
| Must not contain Subject Unique ID | −132 | |
| Contain a Subject DN | 0 | Already present in certificate |
| Extension subjectAltNames is supported as e-mail | 47 | Consists f a number of GeneralNames - root entity will support only rfc822 - email address - estimated at 32 bytes +11 bytes for extnID and 4 bytes for critical flag |
| Extension KeyUsage should appear in all Certificates | 17 | 2 bytes for the bit string + 15 for extension parameters |
| Extended Key usage should appear when appropriate | 65 | Consists of OID. Estimated at 5 OID = 55 Bytes + 15 for extension parameters |
| Certificate Policies should be present with OID | 26 | 11 bytes for root entity OID + 15 for extension parameters |
| Basic Constraints should be present | 19 | 4 bytes for the Boolean + 0 bytes for the path since path is not being used + 15 bytes for extension parameters |
| Subject Key ID should be present | 35 | 20 bytes based on 160-bit SHA-1 hash + 15 bytes for extension parameters |

Certificate Extension - with Root Instructions and Extensions

| Certificate Extension/root entity Specific Instructions | Size (in Bytes) | Size Calculation Comments |
|---|---|---|
| Authority Key ID should be present | 103 | 20 bytes for the hash + 64 for the General Name - assumption that it could be URI + 52 + 4 for serial + 15 for extension parameters |
| Must not contain Name Constraint | 0 | 0 |
| Must not contain Policy Constraint | 0 | 0 |
| AIA must be used for OCSP and RM | 90 | 64 bytes for general name + 11 bytes for OID + 15 for extension parameters |
| Extension - Subscriber Information | 55 | 20 bytes for warranty account + 20 bytes for device id + 15 bytes for extension parameters |
| Total | 193 | |

OCSP Request - with Root Instructions & Extensions

| OCSP Request { | | Size (in Bytes) | Size Calculation Comments |
|---|---|---|---|
| TbsRequest { | | | |
|   Version | Integer | 4 | |
|   RequestorName | Name | 132 | |
|   Request { | | | The Request structure repeats for each request in a particular OCSP request. |
|     ReqCert { | | | |
|       CertID { | | | |
|         HastAlgorithm { | | | |
|           Algorithm | OID | 11 | |
|           Parameters | Defined by Algorithm | 0 | Estimated as O since no parameters passed on the implementation. |
|         } | | | |
|       } | | | |
|       IssuerNameHash | | 20 | |
|       IssuerKeyHash | | 20 | |
|       SerialNumber | | 4 | |
| } } } } | | | |
| Total (Without Extensions) | | 191 | |
| RequestExtensions { | | | |
|   Nonce { | | | |
|     OID | | 11 | |
|     Nonce Value | | 24 | No requirements have been imposed on Nonce Value. Estimated at 24 bytes |
|   } | | | |
|   ServiceLocator { | | | |
|     IssuerName | | 132 | |
|     AIA | | 32 | |
|     OID | | 11 | |
| } } | | | |
| Total (With Extensions) | | 401 | |

OCSP Response - with Root Instructions & Extensions

| OCSP Response { | | Size (in Bytes) | Size Calculation Comments |
|---|---|---|---|
| ResponseStatus { | | | |
|   ResponseBytes { | | | |
|     ResponseType | OID | 11 | |
|     Response | | 32 | |
|   } | | | |
|   BasicOCSPResponse { | | | |
|     TbsResponseData { | | | |
|       Version | Integer | 4 | |
|       ResponderID | Name | 132 | |
|       ProucedAT | GeneralizedTime | 32 | |
|     } | | | |

-continued

| OCSP Response - with Root Instructions & Extensions | | | |
|---|---|---|---|
| OCSP Response { | | Size (in Bytes) | Size Calculation Comments |
| Responses | { | | Repeated for each response |
|   CertID { | | | |
|     Algorithm { | | | |
|       algorithm | OID | 22 | |
|       parameters | Defined by Algorithm | 0 | |
|     } | | | |
|     issuerNameHash | | 20 | |
|     issuerKeyHash | | 20 | |
|       serialNumber | | 4 | |
|   } | | | |
|   CertStatus | | 8 | |
|   ThisUpdate | | 32 | |
|     NextUpdate | | 0 | Not to be used in root entity Responses |
| } | | | |
| SignatureAlgorithm { | | | |
|   Algorithm { | | | |
|     algorithm | | 11 | |
|     Parameters | | 0 | |
|   } | | | |
| } | | 0 | |
|   SignatureValue | | 128 | |
| } | | | |
| Total (Without Extensions) | | 456 | |
| ResponseExtensions { | | | |
|   Nonce { | | | |
|     OID | | 11 | |
|     Nonce Value | | 24 | |
|   } | | | |
|   CRLEntryExtension { | | | |
|     Reason | OID | 11 | |
|     ReasonCd | Enum | 4 | |
|     HoldInstructionCd | OID | 11 | |
|     HoldInstruction | OID | 11 | |
|     InvalidityDate | GeneralizedTime | 32 | |
|     CertificateIssuer | OID | 11 | |
|     CertificateIssuerName | Name | 132 | |
|   } | | | |
|   CRLReason { | | | |
|     Reason | OID | 11 | |
|     ReasonCd | Enum | 4 | |
|     Time | GeneralizedTime | 32 | |
| } | | | |
| Total (With Extensions) | | 750 | |

Valid request and response times for OCSP transactions and warranty transactions and confirmation times for all transactions are preferably specified by root entity 110. The following section describes preferred performance targets for the transaction coordinator. The response times noted refer specifically to the system response time. Preferably, lapsed timeframes in which manual processes are completed (noting the need for verification and requesting it, filing claims, etc.) are also established.

Preferably, the validation request and response time (i.e., OCSP) is ten seconds or less for all response time transactions within the root control infrastructure. Validation outside the root infrastructure (from customer to customer or customer to root) preferably does not exceed sixty seconds. The total round-trip time preferably does not exceed seventy seconds. Preferably the response time includes latency on the Internet. The end-to-end response time preferably includes the longest validation path (i.e. subscribing customer to relying customer to relying participant to issuing participant to root entity).

An illustrative performance requirement may be as follows: No more than 6 seconds between the post of a certificate status check to a relying participant's transaction coordinator and receipt of a response and no more than 3 seconds to turn around a response to a certificate status check where the data for the response is locally available in a case where caching is in effect, proof of freshness (i.e., including status of participant certificates in messages transmitted by the participant) is in effect, a certificate chain of two certificates is being validated, the transaction is a four-corner transaction, and the system entities are connected to a 10 Mbps LAN (rather than the Internet).

The warranty request response time includes offline transactions. Preferably, these offline transactions do not exceed an eight hour window starting at the end of a business day.

The response time for response to notification of lost, compromised, or invalid certificates preferably includes offline transactions. Preferably, these offline transaction do not exceed one hour.

The revocation of certificates also preferably includes offline transactions. Preferably, these offline transactions do not exceed one hour.

The transaction coordinator also preferably provides confirmation of transactions. Online transaction requests preferably receive status confirmation, including incomplete request or response, within seventy seconds. The transaction coordinator also preferably provides a method of storing for retrieval incomplete transaction requests or responses, a receipt of request status, an incomplete request response, and transaction queuing for incomplete transaction.

The transaction coordinator also preferably comprises transaction recovery requirements. Appropriate system resource allocation preferably allows for transaction rollback.

The transaction coordinator also preferably provides system fail-over requirements. In a preferred embodiment, the transaction coordinator is provided with system redundancy, system/hot back-up, and redundancy within the public Internet.

During the development of the transaction coordinator, a performance baseline in the development environment is preferably established. This base-line information is used to improve the performance of the application components on the development machine itself. However, to achieve a preferred target performance, appropriate production hardware capable of supporting the anticipated number of transactions and a network with appropriate band-width are typically put in place.

The following sections discuss preferred tuning strategies for higher performance of the transaction coordinator.

It may be possible to reduce the size of messages being passed between entities by eliminating some or all of the certificates sent with each message. Typically the recipient of a message knows the identity of the sender (i.e., his distinguished name as it appears in his warranty certificate) and has access to his full certification path. Many of the needed certificates are also available from local repositories.

OCSP checks performed as part of the authentication process may be eliminated if the customer database is designed to reflect revoked certificates and if authorization checks are performed against a user's distinguished name and certificate, as opposed to just its distinguished name.

In a preferred embodiment described above, the transaction coordinator stores raw transaction data and then parses the data to separately store a subset of the data for billing purposes. Alternatively, however, this function may be off-loaded to an off-line process that monitors the raw transaction database and extracts relevant billing data from the data stored in the database.

Co-locating the transaction coordinator and OCSP responder eliminates the need to sign and verify requests and to establish secure socket layer connections between these components.

Using secure socket layer between financial institutions and during communications with root entity 110 typically eliminates the need to digitally sign each request message. However, digitally signed requests provide a higher degree of security. Each participant may preferably assess the risks involved with trading off security for performance.

Caching OCSP responses typically improves the turn-around time by reducing the time it takes to send and receive an OCSP request to the root entity. In a preferred embodiment, verification of OCSP responses is performed as the data is put into the cache as opposed to performing verification as part of the on-line transaction processing.

In a preferred embodiment, a transaction coordinator may cache validity responses and use the cached responses to validate credentials. The period for which a response may be cached is preferably set as a policy matter by root entity 110. This period may preferably be within the 4 to 5 minute range.

If a transaction coordinator implements the ability to used cached responses it is preferably adapted to log their use for billing and audit as well as non-repudiation purposes. The logged information preferably indicates that a cached response was used to validate a credential rather than a freshly acquired response.

For high value transactions, a client application may prefer the use of a fresh response rather than a cached response. Accordingly, in a preferred embodiment, transaction coordinators preferably get and use a freshly acquired validity response on explicit request to use a fresh response rather than a cached response.

In a preferred embodiment, the recipient of a response checks the status of the responder's certificate. Alternatively, to eliminate this second request, the transaction coordinator may automatically include the status of its certificate (as signed by the root) whenever it sends a response to either a relying customer or to another transaction coordinator.

The following section discusses testing of the transaction coordinator. Preferably, the transaction coordinator is tested for the items listed in this section.

In order to provide architectural flexibility, the transaction coordinator is preferably ported to more than one hardware platform (e.g. Microsoft Windows NT 4.0/2000, Sun Solaris and Hewlett Packard HP-UX). This allows participants to choose their own hardware platform from the list of the supported platforms. Tests are preferably performed to ensure that the transaction coordinator is installed smoothly on each of the supported platforms. To enable such testing appropriate hardware is typically required.

Tests are preferably performed to ensure that the transaction coordinator may be installed and uninstalled on a clean Windows NT Machine.

If the transaction coordinator is extended to support other operating systems, tests are preferably performed to ensure that the executable derived from the same source code can be installed on all of the supported operating systems. Appropriate hardware with appropriate operating systems may be required to perform these tests.

Preferably, the transaction coordinator interfaces with other third party vendors' software tools. The interfaces to these software tools are preferably tested on the development site during development and system test phase. In addition, elaborate testing is typically done at the customer site to ensure that the transaction coordinator interface with these tools is stable. This may be done during customer/functionality testing, described below.

The functionality of the transaction coordinator is preferably tested during development and system test phases. During these tests, appropriate tools are used to ensure that all of the custom written code is exercised at least once. In a another preferred testing phase, customers test the functionality of the transaction coordinator.

Security is a critical piece of the transaction coordinator. Preferably, testing is done to ensure that data is transferred securely from one point to another. Test cases are preferably created to exhaustively test the security aspect of the public key infrastructure.

A messaging protocol definition for messages transmitted within system 200 and a certificate status protocol definition for system 200 are described in copending U.S. provisional patent application Ser. No. 60/231,319, filed Sep. 8, 2000, entitled Transaction Coordinator Certificate Status Check (CSC) Protocol Definition, Transaction Coordinator Messaging Protocol Definition, and Transaction Coordinator Requirements, which is hereby incorporated by reference. In a preferred embodiment, each transaction coordinator supports this messaging protocol definition. Specifically, each transaction coordinator accepts and routes all valid XML messages as defined in the messaging protocol definition, logs and reports ill-formed messages, and is able to generate valid XML messages in response to requests.

In an alternative embodiment, the system may instead be implemented as an OCSP centric model that does not employ transaction coordinators 202. This alternative embodiment employs enhanced OCSP responders adapted to provide significantly more functionality than normally provided by a typical OCSP responder. In particular, the enhanced OCSP responder is adapted to provide the following additional functionality:

- Encrypted communication using SSL.
- Logging of raw transactions for both requests and responses.
- Providing of certificate chains with responses.
- Verification of signatures on requests preferably using an HSM.
- Validation of certificate chains accompanying requests (parts of which may be stored in a local database or on an HSM).
- Creation of new requests based on:
  - A value in a service locator request extension of a received request.
  - An authority information-access extension in the certificate accompanying a response.
- Suspension of processing on a request until responses are received on these other newly created requests, i.e., ability to synchronize responses to requests.
- Forwarding of responses, when appropriate.

This alternative embodiment provides only portions of the certificate status check service without providing the flexibility of adding new services. Also, billing is not implemented in this alternative embodiment. In addition, this alternative embodiment may cause vendor locking. A detailed list of the pros and cons of this alternative embodiment is provided below.

FIG. 14 depicts the transaction flows for this alternative embodiment. The message flows in FIG. 14 are summarized in the following table:

| | |
|---|---|
| 1 | The Subscribing Customer (SC) sends signed data, the signature, the SC and the IP certificates (and optionally CSSD) to the Relying Customer (RC). |
| 2 | The RC verifies the signature on the data sent by the SC and validates the SC's certificate chain and then creates an OCSP request containing the SC certificate serial number. This data is sent to the HSM for signature. |
| 3 | The OCSP request for the SC's certificate, signed by the RC is sent to the Relying Participant (RP) OCSP Responder (OR) along with the RC's certificate chain. The entire certificate chain must be passed with the message. |
| 4 | The RP OCSP Responder logs the request in its OCSP log. The RP OCSP Responder verifies the signature on the request and validates the RC's certificate chain. All verification if performed is software. The entire chain (including the root) must be passed with the message in order for verification of the signature/certificate chain to be performed. No checks are performed to ensure that the RC's certificate has not been revoked. |
| 5 | The RP OCSP Responder creates a new request, containing the single request received from the RC, and signs it using its HSM. Signed requests between financial institutions are not required. Instead, the root entity (ROOT) may require SSL client-side authentication in which case the verification/validation/customer look up is based on the certificates associated with the SSL connection. |
| 6 | The RP OCSP Responder sends the signed OCSP request to the appropriate Issuing Participant's OCSP Responder based on the value in the Service Locator request extension of the received request. |
| 7 | The IP OCSP Responder logs the request in its OCSP log. The IP OCSP Responder verifies the signature on the request and validates the RP OR's certificate chain. All verification if performed in software. The entire chain (including the root) must be passed with the message in order for verification of the signature/certificate chain to be performed. |
| 8 | The IP OCSP Responder creates an OCSP request containing the serial number of the RP OCSP Responder's certificate and signs it using its HSM. |
| 9 | The IP OCSP Responder then sends the request to the ROOT OCSP Responder based on the authority information access extension in the certificate associated with the signature on the request received in Step 4. The IP OCSP Responder waits for a response from the ROOT regarding the RP OCSP Responder's certificate before issuing a response on the SC's certificate. If the IP only requires SSL client-side authentication and does not require signed OCSP requests, this step may not be necessary. |
| 10 | The ROOT OCSP Responder logs the request in its OCSP log. The ROOT OCSP Responder verifies the signature on the request and validates the IP OCSP Responder's certificate chain. Signed requests between financial institutions are not required. Instead, the ROOT may require SSL client-side authentication in which case the verification/validation/customer look up is based on the certificates associated with the SSL connection. |
| 11 | The ROOT OCSP Responder checks its local database to determine the status of the RP OCSP Responder's certificate, then it generates a response and signs it using its HSM. |
| 12 | The ROOT OCSP Responder then returns the response to the IP OCSP Responder. |
| 13 | The IP OCSP Responder logs the response in its OCSP log. The IP OCSP Responder verifies the signature on the request and validates the Root's OCSP Responder certificate chain. It should be noted, however, that there may not be enough information maintained in the logs to support non-repudiation. The entire certificate chain must be passed with the message. |
| 14 | The IP OCSP Responder then checks its local database to determine the status of the SC's certificate. The IP OCSP Responder generates a response and signs it using its HSM. |
| 15 | The IP OCSP Responder sends the signed response to the RP OCSP Responder. |

16 The RP OCSP Responder logs the OCSP response in the OCSP log. The RP OCSP Responder verifies the signature on the response and validates the IP's OCSP Responder certificate chain. The entire certificate chain must be passed with the message.
17 The RP OCSP Responder creates an OCSP request containing the serial number of the IP OCSP Responder's certificate and signs it using its HSM.
18 The RP OCSP Responder then sends the request to the ROOT OCSP Responder based on the authority information access extension in the certificate associated with the signature on the response received in step 14.
19 The ROOT OCSP Responder logs the raw request in its OCSP log. The ROOT OCSP Responder verifies the signature on the request and validates the entire RP OCSP Responder's certificate chain. The entire certificate chain must be passed with the message.
20 The ROOT OCSP Responder checks its local database to determine the status of the IP OCSP Responder's certificate, then it generates a response and signs it using its HSM.
21 The ROOT OCSP Responder sends the signed response to the OCSP Responder.
22 The RP OCSP Responder logs the response in its OCSP log. The RP OCSP Responder verifies the signature on the response and validates the Root's OCSP Responder certificate chain. The certificate chain may be passed with the message, or parts of the chain may reside either on the HSM or in the Certificate Verification database.
23 The RP OCSP Responder creates a response for the RC that contains information it received in step 2 (e.g., the nonce) and the status information on the SC's certificate it received in step 14 and signs it using its HSM.
24 The RP OCSP Responder returns the response to the RC.
25 The RC uses its HSM to verify the signature on the response and validate the RP's OCSP Responder certificate chain. The certificate chain may be passed with the message, or parts of the chain may reside on the HSM.
26 The RC creates an OCSP request containing the IP's certificate serial number. This data is sent to the HSM for signature.
27 The OCSP request for the IP's certificate, signed by the RC, is sent to the Relying Participant (RP) OCSP Responder (OR) along with the RC's certificate chain. The entire certificate chain needs to be passed with the message.
28 The RP OCSP Responder logs the request in its OCSP log. The RP OCSP Responder verifies the signature on the request and validates the RC's certificate chain. All verification if performed in software. The entire chain (including the root) must be passed with the message in order for verification of the signature/certificate chain to be performed. No checks are performed to ensure that the RC's certificate has not been revoked.
29 The RP OCSP Responder creates a new request, containing the single request received from the RC, and signs it using its HSM. Signed requests between financial institutions are not required. Instead, the ROOT may require SSL client-side authentication in which case the verification/validation/customer look up is based on the certificates associated with the SSL connection.
30 The RP OCSP Responder sends the signed OCSP request to the ROOT OCSP Responder based on the value in the Service Locator request extension of the received request.
31 The ROOT OCSP Responder logs the request in its OCSP log. The ROOT OCSP Responder verifies the signature on the request and validates the RP OR's certificate chain. All verification is performed in software. The entire chain (including the root) must be passed with the message in order for verification of the signature/certificate chain to be performed.
32 The ROOT OCSP Responder checks its local database to determine the status of the RP OCSP Responder's certificate, then it generates a response and signs it using its HSM.
33 The ROOT OCSP Responder then returns the response to the RP OCSP Responder.
34 The RP OCSP Responder logs the response in its OCSP log. The RP OCSP Responder verifies the signature on the response and validates the ROOT's OCSP Responder certificate chain. It should be noted that there may not be enough information maintained in the logs to support non-repudiation. The entire certificate chain must be passed with the message.

This OCSP proxy centric model has advantages and disadvantages when compared to the transaction coordinator model described above. The pros and cons of this alternative embodiment are summarized in the table below:

| Pros | Cons |
| --- | --- |
| Takes away some of the complexity of implementing the transaction coordinator as an initial phase by reducing functionality and pushing code changes to the manufacturer of the OCSP responder. | Two OCSP Responder are required: one that re-signs responses, one that forwards signed responses without re-signing. |
| Allows the basic security infrastructure to be put in place and tested. | No authorization checks are performed. Signatures are verified by the OCSP Responder but there are no checks |

| Pros | Cons |
| --- | --- |
| | performed to determine whether or not the request is from an authorized customer. There are no OCSP checks performed to determine if a requestor's certificate has been revoked. All certificates in a requestor's/responder's chain must be sent with the request/response in order for the OCSP Responder to verify the signatures. This significantly increases the size of the messages. The RC must send individual requests to the RP - multiple certificate statuses cannot be requested in the same message if they need to be processed by different OCSP responders. Not enough information is maintained in the logs for non-repudiation purposes. It is not clear whether enough information about the requestor is retained for billing purposes. Can only perform certification status checks. Will still require a transaction coordinator to fulfill other services. Will not provide generic reusable core components. The IETF OCSP Responder specification does not require Responder to provide this additional functionality. |

Technical and security requirements for OCSP responder 204 are preferably specified by root entity 110. An exemplary set of requirements is described below.

Technical Requirements

In a preferred embodiment, each OCSP responder 204 operates pursuant to the Online Certificate Status Protocol (OCSP).

In a preferred embodiment, when an OCSP responder 204 receives an OCSP request, it validates the requestor's certificate, authenticates the requester, and verifies that the requester is a contracted system user with the participant that received the request by performing a local status check on the requestor's certificate. Authentication of the requestor may be accomplished using the signed OCSP request, in the case of an inter-institution request, or through secure socket layers client authentication, in the case of a customer request. In addition, secure socket layers may be required to ensure the confidentiality of all requests.

In a preferred embodiment, each OCSP responder 204 selects peer servers when making inter-institution requests based on a locator extension of the requested service and a local table. In an alternative embodiment, this information may be obtained by lightweight directory access protocol (LDAP) look up.

In a preferred embodiment, each OCSP responder 204 may cache certificates subject to rules specified by root entity 110.

In a preferred embodiment, each OCSP responder 204 verifies that inter-institution responses have been signed by an authorized responder certificate. For inter-institution OCSP requests, the OCSP responder of the relying participant 204 preferably re-signs the response from, e.g., issuing participant 102 before transmitting it to the requestor.

In a preferred embodiment, each OCSP responder supports the following responses: "revoked," "good," and "unknown." If a client OCSP responder receives a "revoked" response regarding a particular certificate produced at a time t, then the client OCSP responder assumes that that certificate, or some certificate in the certificate chain of that certificate was revoked prior to time t. As such, the client OCSP responder does not possess sufficient evidence to transfer liability for documents that have been digitally signed after time t using the private key corresponding to the checked certificate to the server OCSP responder.

If a client OCSP responder receives a "good" response regarding a particular certificate, produced at a time t, then the client OCSP responder assumes that that certificate and every other certificate in its certificate chain was in good standing at time t. As such, the client OCSP responder has sufficient evidence to transfer liability for documents that have been digitally signed prior to time t to the server OCSP responder.

If the client OCSP responder receives an "unknown" response regarding a particular certificate produced at time t, then the client OCSP responder assumes that that certificate, or a certificate in the certificate chain of that certificate, is not known to be in good standing. As such, the client OCSP responder does not possess sufficient evidence to transfer liability for documents that have been digitally signed using the private key corresponding to the checked certificate to the server OCSP responder.

Security Requirements

In a preferred embodiment, each OCSP responder 204 stores its private keys in a hardware security module that meets requirements established by root entity 110.

In a preferred embodiment, each OCSP responder 204 uses separate keys for server secure socket layers, client secure socket layers, and OCSP responses.

In a preferred embodiment, each OCSP responder 204 has the ability to operate on institution-hardened platform configurations. An institution-hardened platform is a tried and tested platform that is approved for use within an institution's firewall.

In a preferred embodiment, each OCSP responder 204 maintains detailed logs of all signed requests and responses, all exceptions or errors, and all administrative and configuration actions.

In a preferred embodiment, each OCSP responder 204 uses strong authentication, such as secure socket layers client authentication, to authenticate entities for all administrative transactions.

In a preferred embodiment, each OCSP responder 204 meets minimum security requirements established by root entity 110. In addition, the institution that maintains the OCSP responder may specify additional OCSP responder security rules.

In a preferred embodiment, each OCSP responder 204 is configured to be highly available and deployable in a replicated mode. In addition, each OCSP Responder preferably responds to all requests in less than one second.

OCSP responders are not typically required to perform checks on utility certificates. They may, however, be configured to allow a requestor unauthenticated access to the status of a utility certificate.

In a preferred embodiment, an OCSP responder may be required to serve as an authenticated interface to an institution's repository. Implementation details of this preferred embodiment may be left to the entity that maintains the OCSP responder.

In a preferred embodiment, each OCSP Responder comprises additional interfaces to support additional functionality. In particular, each OCSP responder preferably comprises an additional interface to make information available to support a participant's customer-service requirements. In addition, each OCSP responder preferably comprises an institution-defined standard interface for exporting system and event logs. Each OCSP responder may also comprise an interface for export of information for billing applications. Billing data may be exported in any format including logs but preferably enables the requestor to determine the type and volume of the request.

In a preferred embodiment, participants 102, 104 shown in FIG. 1 are referred to as level-one participants because they are issued digital certificates directly by root entity 110. Accordingly, the certificate chain of each participant begins at root entity 110. Each level one participant relies on root entity 110 to obtain the status of certificates of other level-one participants.

In a further preferred embodiment, the present system may comprise additional participants, called level-two participants. Each level-two participant is preferably issued a digital certificate by a level-one participant with which it is associated. These level-two participants may then serve as certificate authorities for their respective customers and provide system services to those customers.

Level one participants preferably provide the highest point of trust for level two participants. As such, level two participants preferably report directly to their sponsoring level one participant. Level two participants must also rely on their sponsoring level one participants to obtain the status of certificates of other participants. A preferred embodiment including level one and level two participants is further described in copending U.S. patent application Ser. No. 09/502,450, filed Feb. 11, 2000, entitled System and Method for Providing Certification-Related and other Services, which is hereby incorporated by reference.

In a preferred embodiment, each participant collectively implements and maintains a hardware and software configuration baseline that identifies the operating environment of the hardware and software components of each participant. As such, the configuration baseline serves as a configuration reference which facilitates the daily operation and management of the system. The baseline facilitates the integration of configuration changes made by one or more participants on a system-wide level. In addition, the baseline facilitates system-wide service recovery in the event of hardware or software failures of one or more certification authorities.

In a preferred embodiment, a master copy of the configuration baseline for the present system is maintained by root entity 110. Typically, the master copy is kept by an officer of root entity 110, such as the Vice President of Operations.

In a preferred embodiment, root entity 110 keeps a true and accurate record of root entity 110's hardware and software configuration. At least three copies of the root certification authority's configuration baseline are preferably retained by root entity 110 at the following three locations: (1) at the same physical location of the root certification authority thereby allowing operational changes to be recorded as they occur; (2) at a secure location outside the physical location of the root certification authority but in a controlled container; and (3) at an offsite location with root entity 110's backup and archive records. Other copies of this hardware and software configuration may be provided to level one certification authorities at the discretion of root entity 110.

In a preferred embodiment, each level one participant maintains a true and accurate record of the hardware and software configuration of its certification authority architecture. Each level one participant preferably prepares, retains, and maintains at least three copies of its configuration baseline document in the following three locations: (1) at the same physical location of the level one certification authority thereby allowing operational changes to be recorded as they occur; (2) at a secure location outside the physical location of the level one certification authority but in a controlled container; and (3) at an offsite location with the level one certification authority's backup and archive records. In addition, each level one participant preferably provides a copy of its configuration baseline to root entity 110.

In a preferred embodiment, level two participants also maintain a true and accurate record of the hardware and software configuration of their certification authority architecture. Each level two participant prepares, retains, and maintains at least three copies of its configuration document in the following three locations: (1) at the same physical location as the level two certification authority thereby allowing operational changes to be recorded as they occur; (2) at a secure location outside the physical location of the level two certification authority but in a controlled container; and (3) at an off-site location with the level two certification authority's back up and archive records. In addition, each level two participant preferably provides a copy of its configuration baseline to its sponsoring level one certification authority.

Forms may be provided to facilitate documentation of hardware and software configurations. In a preferred embodiment, the hardware and software configurations of root entity 110's and each participant's certification authority directory, OCSP responder, and Internet firewall are also documented.

In a preferred embodiment, root entity 110 has primary responsibility for configuration management on a system-wide level. This responsibility is typically delegated to an officer of root entity 110, such as the Vice President of Operations. Each certificate authority preferably comprises a technical operations staff which has the operational responsibility for maintaining an accurate record of the certification authority's hardware and software configuration.

In a preferred embodiment, the initial configuration baseline of each certificate authority is produced by commissioning the configuration baselines of each subordinate certification authority.

In a preferred embodiment, a configuration change must comply with the following criteria: (1) a configuration change must be required to address a defined system requirement; (2) a configuration change must be recommended by the certification authority's operations staff; (3) a configuration change to the operational platforms must be approved by an officer, such as the Vice President of Operations in the case of the root entity, and a senior manager accountable for the integrity of the certification authority, in the case of a level one or level two certification authority; (4) notice of configuration changes must be given to any affected parties; (5) a configuration change must take into account relevant configuration change criteria imposed by governmental or standards setting bodies; and (6) a configuration change must be recorded by setting out the date of the change and the period of each previous configuration. Each certificate authority typically archives configuration changes with other archived materials such as backup tapes.

In a preferred embodiment, the configuration baseline is implemented in conjunction with the root entity's system security policy and is an audited component of each certification authority.

While the invention has been described in conjunction with specific embodiments, it is evident that numerous alternatives, modifications, and variations will be apparent to those skilled in the art in light of the foregoing description.

The invention claimed is:

1. An apparatus for facilitating computerized transactions between at least a first entity and a second entity, the apparatus comprising:
   a first server, said server comprising a first transaction coordinator associated with said first entity;
   a second server, said server comprising a second transaction coordinator associated with said second entity and communicatively coupled to said first transaction coordinator via a communications network;
   said first transaction coordinator comprising an interface module that communicates with said second transaction coordinator, said interface module comprising a transaction coordinator request manager component and a transport services component;
   said first transaction coordinator further comprising, coupled to the interface module,
      a set of service modules comprising a digital certificate status check module that validates digital certificates of said entities, a warranty service module that guarantees an identity of an entity that signs an electronic communication relating to a transaction, and a payment guarantee module that provides a first entity with confirmation of a second entity's ability to fulfill a financial obligation; and
      a set of core components comprising a logging component that provides non-repudiation and security auditing services, a billing component that creates and stores a transaction billing history for responses and requests received by the transaction coordinator, and a digital signature component that uses cryptographic processing to verify digital signatures.

2. The apparatus of claim 1 further comprising, coupled to the interface module, a transaction monitor that ensures that computerized transactions coordinated by the transaction coordinator exhibit atomicity; wherein:
   all actions required to complete a transaction succeed or all said actions fail; and
   each transaction is an indivisible unit of work.

3. The apparatus of claim 1 wherein:
   the transaction coordinator is a part of a public key infrastructure, and the transaction coordinator further comprises, coupled to the interface module, a transaction monitor that ensures that computerized transactions coordinated by the transaction coordinator exhibit consistency; wherein:
   after a transaction is executed, either the public key infrastructure is left in a correct stable state, or else the public key infrastructure returns to a state preceding initiation of the transaction.

4. The apparatus of claim 1 further comprising, coupled to the interface module, a transaction monitor that ensures that computerized transactions coordinated by the transaction coordinator exhibit isolation; wherein:
   each transaction is unaffected by other transactions executing concurrently.

5. The apparatus of claim 1 further comprising, coupled to the interface module, a transaction monitor that ensures that computerized transactions coordinated by the transaction coordinator exhibit durability; wherein:
   effects of each transaction are permanent after the transaction is performed.

6. The apparatus of claim 1 further comprising, coupled to the interface module, a component transaction monitor from the group of monitors consisting of Orbix OTM and BEA Weblogic.

* * * * *